United States Patent
Mo et al.

(10) Patent No.: US 8,705,977 B1
(45) Date of Patent: Apr. 22, 2014

(54) EQUALIZER TAP CORRECTION AND RESEEDING

(75) Inventors: Fan Mo, Hinckley, OH (US); Sameep Dave, Hinckley, OH (US); Yuri Zelensky, Lyndhurst, OH (US)

(73) Assignee: ViaSat, Inc., Carlsbad, CA (US)

( * ) Notice: Subject to any disclaimer, the term of this patent is extended or adjusted under 35 U.S.C. 154(b) by 99 days.

(21) Appl. No.: 13/356,192

(22) Filed: Jan. 23, 2012

Related U.S. Application Data

(60) Provisional application No. 61/435,278, filed on Jan. 22, 2011.

(51) Int. Cl.
*H04B 10/00* (2013.01)
*H04B 10/69* (2013.01)
*H04B 10/61* (2013.01)

(52) U.S. Cl.
CPC ........ *H04B 10/6971* (2013.01); *H04B 10/6166* (2013.01)
USPC ............ 398/159; 398/152; 398/205; 398/208

(58) Field of Classification Search
CPC ........................ H04B 10/6166; H04B 10/6971
USPC ........... 398/29, 33, 81, 85, 147, 152, 159, 65, 398/205, 208, 209
See application file for complete search history.

(56) References Cited

U.S. PATENT DOCUMENTS

| | | | |
|---|---|---|---|
| 7,251,256 B1 | 7/2007 | Barry et al. | |
| 7,266,310 B1 | 9/2007 | Savory et al. | |
| 7,522,841 B2 * | 4/2009 | Bontu et al. | 398/154 |
| 8,095,019 B2 | 1/2012 | Kaneda et al. | |
| 8,478,135 B2 | 7/2013 | Xie | |
| 8,571,423 B2 | 10/2013 | Winzer | |
| 2004/0184487 A1 | 9/2004 | Kim | |
| 2004/0223767 A1 | 11/2004 | Pappalardo et al. | |
| 2006/0013590 A1 * | 1/2006 | Hueda et al. | 398/149 |
| 2007/0065078 A1 | 3/2007 | Jiang | |
| 2007/0217792 A1 | 9/2007 | Nonaka et al. | |
| 2008/0152361 A1 | 6/2008 | Chen et al. | |
| 2010/0209121 A1 * | 8/2010 | Tanimura | 398/202 |
| 2010/0232809 A1 | 9/2010 | Cai et al. | |

(Continued)

FOREIGN PATENT DOCUMENTS

EP             2352239 A1     8/2011

OTHER PUBLICATIONS

International Search Report and Written Opinion dated Aug. 30, 2012, PCT/US2012/022231 to ViaSat, Inc. et al., 8 pgs.

(Continued)

*Primary Examiner* — Dalzid Singh
(74) *Attorney, Agent, or Firm* — Holland & Hart LLP

(57) ABSTRACT

Methods, systems, and devices are described for tap adjustment and reseeding in a digital filter. Filter and signal characteristics are measured and tap adjustments and reseeding of tap values may be performed based on the filter and signal characteristics. Filter characteristics that may be measured include a filter center of mass which may provide an indication that filter taps for a filter may be drifting toward a filter edge and thus reducing the dynamic range of the filter. Signal characteristics may include a timing offset between received input signals, and characteristics related to which of a particular input signal is present at a filter output. Filter taps, according to various embodiments, may be adjusted, and/or re-initialized responsive to one or more of the signal or filter characteristics.

47 Claims, 21 Drawing Sheets

(56) References Cited

U.S. PATENT DOCUMENTS

| | | |
|---|---|---|
| 2010/0239264 A1 | 9/2010 | Yang et al. |
| 2010/0329677 A1 | 12/2010 | Kaneda et al. |
| 2011/0064421 A1 | 3/2011 | Zhang et al. |
| 2012/0033965 A1 | 2/2012 | Zhang et al. |
| 2013/0136450 A1* | 5/2013 | Roberts et al. .................. 398/65 |

OTHER PUBLICATIONS

International Search Report and Written Opinion dated Aug. 30, 2012, PCT/US2012/022234 to ViaSat, Inc. et al., 10 pgs.

Non-final Office Action dated Dec. 28, 2012, U.S. Appl. No. 13/205,431 to Mo et al., 12 pgs.

International Preliminary Report on Patentability dated Aug. 1, 2013, Int'l App. No. PCT/US2012/022231 to ViaSat, Inc. et al., 5 pgs.

International Preliminary Report on Patentability dated Aug. 1, 2013, Int'l App. No. PCT/US2012/022234 to ViaSat, Inc. et al., 6 pgs.

Non-final Office Action dated Jul. 29, 2013, U.S. Appl. No. 13/205,431 to Mo et al., 12 pgs.

Non-final Office Action dated Nov. 22, 2013, U.S. Appl. No. 13/205,437 to Mo et al., 16 pgs.

* cited by examiner

2100

EQUALIZER TAP CORRECTION AND RESEEDING

CROSS REFERENCES

The present application claims the benefit of U.S. Provisional Patent Application No. 61/435,278, filed on Jan. 22, 2011, entitled "HIGH RATE OPTICAL COMMUNICATION," which is incorporated herein by reference in its entirety. This application also incorporates by reference, in its entirety, U.S. patent application Ser. No. 13/205,437, filed on Aug. 8, 2011, entitled "ADAPTIVE PMD EQUALIZER AND IMPLEMENTATION."

BACKGROUND

The present disclosure relates to systems and methods for equalizer tap management in dual polarization fiber optic communications systems in general and, in particular, to tap correction and reseeding in an adaptive polarization mode dispersion (PMD) equalizer in such systems.

Fiber optic channels in network communications systems are well known and are considered effective for data transmission, allowing relatively high bandwidth data communication. Optical fiber used in such channels is flexible and may be bundled as cables, and is generally considered to be advantageous for long-distance communications, because light propagates through the fiber with little attenuation compared to electrical cables. Typical present day commercial optical fiber systems transmit data at 10 or 40 Gbit per second. Each fiber may carry multiple independent channels, each using a different wavelength of light in a technique known as wavelength-division multiplexing (WDM), thereby enhancing the net data rate of an optical fiber.

As more capacity is continually desired for networks, increased data transmission rates would be desirable. However, in fiber optic systems, as data rates increase various optical phenomena begin to manifest and act to limit data transmission rates. For example, optical effects from polarization mode dispersion (PMD) may have an impact on the data transmission rate.

SUMMARY

Methods, systems, and devices are described for tap adjustment and reseeding in a digital filter. A center of mass calculator may perform center of mass related offset and error calculations, a tap offset control module may output updated tap values to a filter, and a tap reset control module may reset output signals to reset or re-initialize filter taps of associated digital filters.

In one embodiment, a center of mass offset calculator receives filter tap energies from a number of filters. The filter tap energies may include current tap values for filter taps of FIR filters, for example. The filter tap energies, in an embodiment, are received from separate subsets of filters, such as positive and negative tap values for the filters. The center of mass offset calculator receives the filter tap energies, calculates a center of mass of the filter, and generates outputs to shift the center of mass when combined tap energies of one subset of filter taps exceeds combined tap energies of the other subset of filter taps by a predetermined threshold. Shifting the center of mass may move the center of mass closer to the center of the filter to counter the movement of filter taps towards the edges of the filter. The center of mass offset calculator, in an embodiment, determines if the combined energies of the sets of filter taps are unbalanced and, where the combined energies are unbalanced by greater than a predetermined threshold, generates an update to the tap values to bring the combined tap energies of the two sets of taps more into balance.

In another embodiment, timing offset between signals of different polarity optical signals may be compensated. In one embodiment, a tap update module receives timing information related to the inter-pole offset between horizontal and vertical polarity signals output from a filter. This timing offset information may indicate that the signal from one of the polarities is being received before or after the signal from the other polarity. When a signal is initially acquired, the filter receives channels and converges on a set of filter tap values that are then adjusted as the channel conditions of the optical transport fiber change. In the event that a timing offset is present between the two polarity signals when the signal is initially acquired, the filter taps may be shifted to compensate for the timing offset such that the output signals have little or no timing offset between the two polarity signals. When the channel condition improves and, as a result, there is little or no timing offset between the two polarity signals, the filter taps will arrive at near the center of the filter's range of adjustment. In this manner, the filter will have greater ability to compensate for a relatively wide range of channel conditions.

According to certain other embodiments, a tap update module may re-initialize filter taps in the event that a filter, upon acquisition of an input having different polarity signals, outputs two versions of the same polarity signal. Such a situation may occur when the channel conditions result in a rotation of each of the polarities of the optical signal such that both polarities are rotated by about 45 degrees, for example. In such a situation, the filter outputs for both the horizontal and vertical polarity signals may converge to output the same signal, such as both outputs providing a filtered vertical polarity signal. The tap update module receives an indication of such a condition and may re-initialize the filter taps for one of the polarities and allow the filter to re-converge. The filter may then converge to output the correct polarity signal. In the event that the filter converges on the incorrect polarity signal again, the filter taps may again be re-initialized, until the filter converges to the correct signal. In some embodiments, the tap update module re-initializes the filter taps associated with one of the polarity signals to an initial or default value. In other embodiments, the tap update module re-initializes the filter taps associated with one of the polarity signals based on the tap values for the other polarity signal, thus increasing the likelihood that the filter will properly converge on the correct polarity signal.

BRIEF DESCRIPTION OF THE DRAWINGS

A further understanding of the nature and advantages of embodiments of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
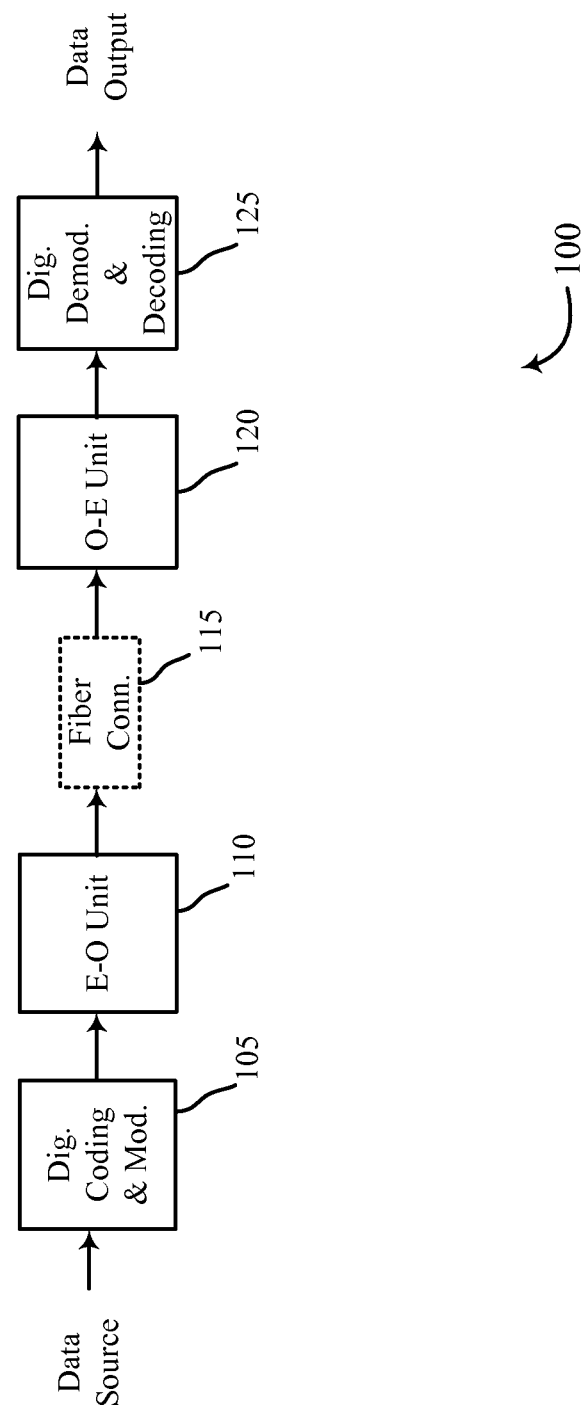
FIG. 1 is a block diagram of an optical communication system including components configured according to various embodiments of the disclosure.

Methods, systems, and devices are described for tap adjustment and reseeding in a digital filter. Filter and signal characteristics are measured and tap adjustments and reseeding of tap values may be performed based on the filter and signal characteristics. Filter characteristics that may be measured may include a filter center of mass which may provide an indication that filter taps for a filter may be drifting toward a filter edge and thus reducing the dynamic range of the filter. Signal characteristics may include a timing offset between received input signals, and characteristics related to which of a particular input signal is present at a filter output. Filter taps, according to various embodiments, may be adjusted, and/or re-initialized responsive to one or more of the signal or filter characteristics.

A center of mass calculator, according to some embodiments, may perform center of mass related offset and error calculations. The center of mass calculator may receive filter tap energies from a number of filters and calculate a center of mass of the filter. If it is determined that the center of mass of the filter has moved toward one edge of the filter, the center of mass may be shifted to help move the center of mass closer to the center of the filter. The center of mass offset calculator, in an embodiment, determines if the combined energies of the sets of filter taps are unbalanced and, where the combined energies are unbalanced by greater than a predetermined threshold, generates an update to the tap values to bring the combined tap energies of the two sets of taps more into balance.

In other embodiments, timing offset between signals of different polarity optical signals may be compensated. In one embodiment, a tap update module receives timing information related to the inter-pole offset between horizontal and vertical polarity signals output from a filter. In the event that a timing offset is present, filter taps may be reset such that when there is little or no timing offset between the two polarity signals, the filter taps are at or near the center of the filter's range of adjustment. In this manner, the filter will have greater ability to compensate for a relatively wide range of channel conditions.

According to certain other embodiments, a tap update module may re-initialize filter taps in the event that a filter, upon acquisition of an input having different polarity signals, outputs two versions of the same polarity signal. Such a situation may occur when the channel conditions result in a rotation of each of the polarities of the optical signal such that both polarities are rotated by about 45 degrees, for example. The tap update module receives an indication of such a condition and may re-initialize the filter taps for one of the polarities and allow the filter to re-converge. The filter may then converge to output the correct polarity signal. In the event that the filter converges on the incorrect polarity signal again, the filter taps may again be re-initialized, until the filter converges to the correct signal. In some embodiments, the tap update module re-initializes the filter taps associated with one of the polarity signals to an initial or default value. In other embodiments, the tap update module re-initializes the filter taps associated with one of the polarity signals based on the tap values for the other polarity signal, thus increasing the likelihood that the filter will properly converge on the correct polarity signal.

This description provides examples, and is not intended to limit the scope, applicability or configuration of embodiments of the present invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

According to various embodiments, an optical communication system utilizes fiber optic optical cables as a data transmission medium. An example of an optical data transport system 100 is illustrated in FIG. 1. In this embodiment, the optical data transport system 100 includes a data source that provides data to a digital coding and modulation unit 105. The data source may include any of a number of common data sources, such as a user telecommunications device, a cable operator head-end unit, a telecommunications provider central office, a computer server, or a network attached storage system, to name but a few examples. In many embodiments, the data source generates significant quantities of data to be transported across the optical data transport system 100. The digital coding and modulation unit 105 receives this data, and performs framing, forward error correction coding, and modulation functions on the data. The electrical-to-optical (E-O) unit 110 transforms the data into optical signals, and transmits optical signals containing the data via a fiber connection 115. The fiber connection 115 may include well known components of such connections, including a fiber optic cable. An optical-to-electrical (O-E) unit 120 receives the optical signal from the fiber connection 115, and transforms the data into the electrical domain.

Channel conditions in the fiber connection 115 may introduce various distortions and noise into the optical signal. The digital demodulation and decoding unit 125 receives the digitized version of the optical signal and performs demodulation, forward error correction decoding, and de-framing functions on the data from the optical signal. The digital demodulation and decoding unit 125 may compensate for distortions and noise introduced into the optical signal through various filtering and other techniques. Various techniques described herein allow for enhanced and efficient filtering of received signals, as will be described in more detail below. The digital demodulation and decoding unit 125 may then output the data (e.g., to a user telecommunications device, a cable operator head-end unit, a telecommunications provider central office, a computer server, or a network attached storage system).

Figure 2:
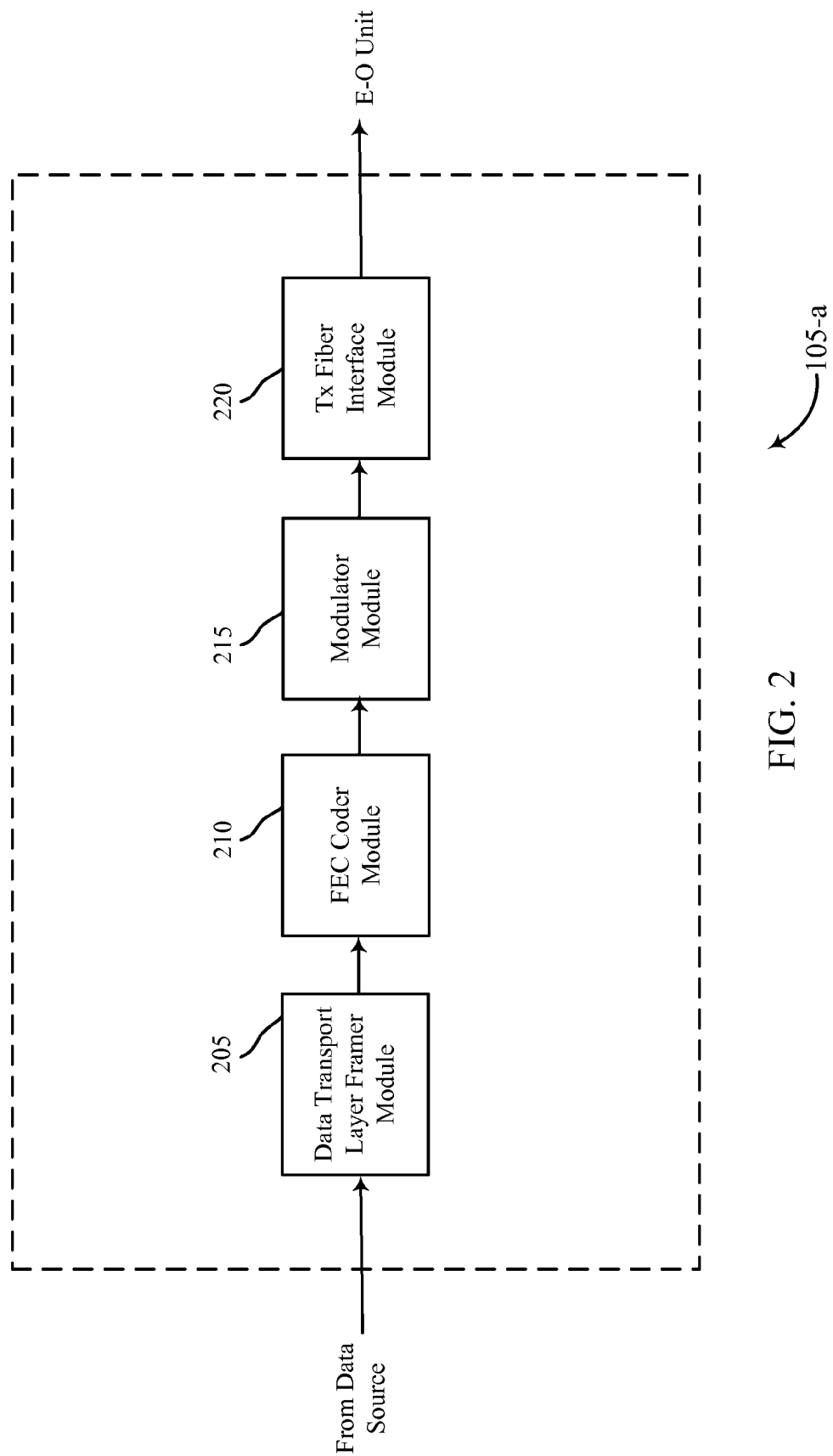
FIG. 2 is a block diagram of an electrical-to-optical unit according to various embodiments of the disclosure.

FIG. 2 illustrates a digital coding and modulation unit 105-a. In the illustrated embodiment, the digital coding and modulation unit 105-a includes a data transport layer framer module 205, an FEC coder module 210, a modulator module 215, and a transmitter fiber interface module 220. The data transport layer framer module 205 may place the data received from the data source into packet frames for transmission. The packet frames may conform to one of many common protocols for packet frames used in optical communications systems which commonly include a header and a payload, and possibly a trailer, such as a CRC. As is well understood, the header may be interleaved with the payload during transmission, depending upon the particular protocol being used for optical transmission. The FEC coder module 210 calculates and adds forward error correction (FEC) information to the frames of data received from the data transport layer framer module 205. The particular type of FEC information of various embodiments generally includes systematically generated redundant error-correcting code (ECC) data that is transmitted along with the frames. The modulator module 215 modulates the frames and FEC information, forwarding the data to a transmitter fiber interface module 220. The transmitter fiber interface module 220 may forward the modulated data to the E-O module where it may be transmitted in the optical domain via a dual-polarity (dual-pole) quadrature phase-shift-keying (QPSK) modulation, resulting in four parallel optical streams. Other modulation schemes may be used in other examples, as well.

Figure 3:
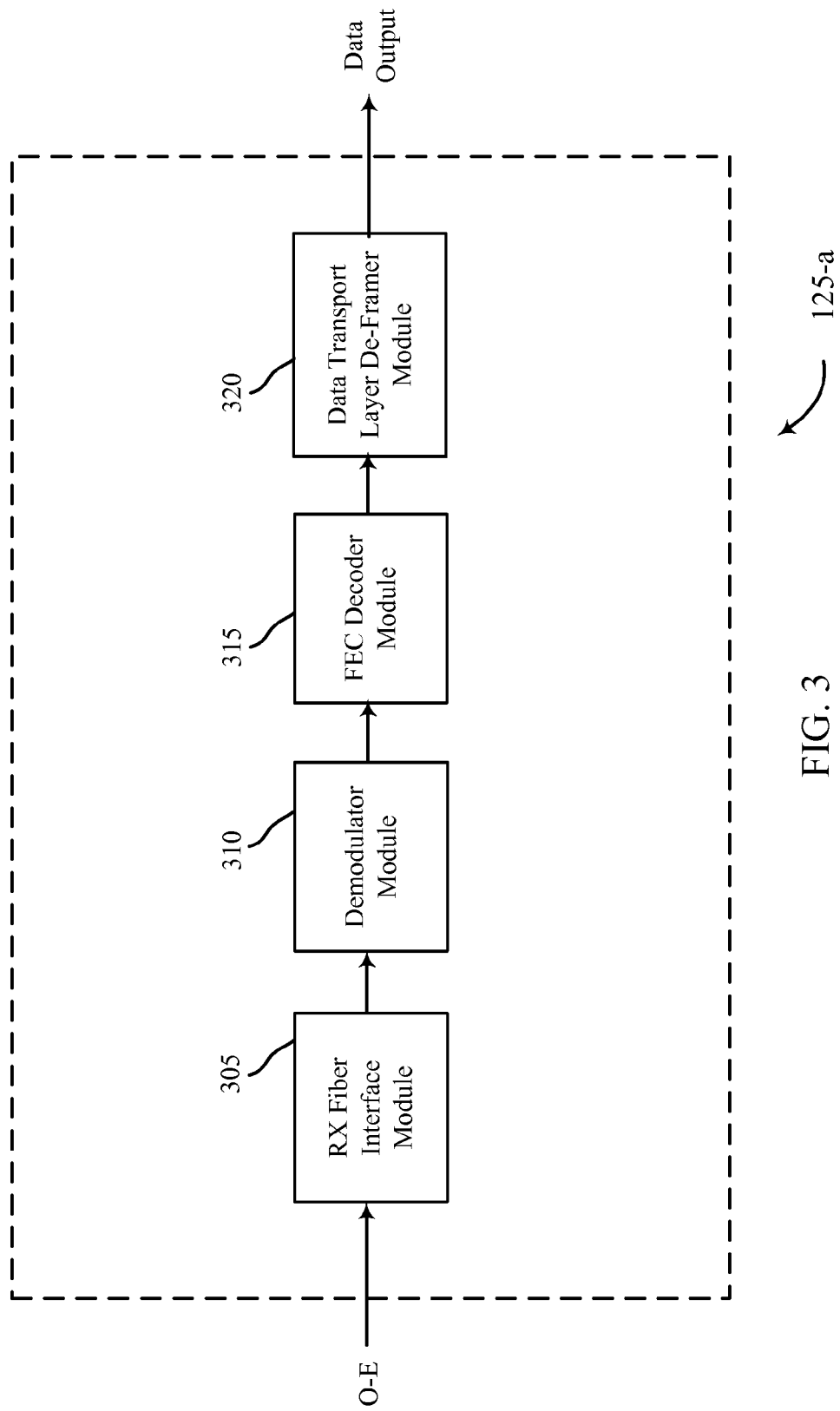
FIG. 3 is a block diagram of an optical-to-electrical unit according to various embodiments of the disclosure.

As illustrated in FIG. 3, a digital demodulation and decoding unit 125-a may include a number of modules, as well. In this embodiment the digital demodulation and decoding unit 125-a includes a receiver fiber interface module 305, a demodulator module 310, an FEC decoder module 315, and a data transport layer de-framer module 320. The receiver fiber interface 305 is the interface from the O-E unit 120. The receiver fiber interface module 305 provides electrical signals to a demodulator module 310. Various embodiments of the demodulator module 310 will be discussed in further detail below. The demodulator module 310, according to various embodiments, may compensate for distortions and noise introduced into the optical signal through various filtering and other techniques. Systems and methods described herein allow for enhanced and efficient filtering of received signals, as will be described in more detail below. The information from the demodulator module 310 is provided to the FEC decoder module 315 which decodes and may correct transmission errors identified from error-correcting code. The FEC decoder module 315 provides decoded data to the data transport layer de-framer module 320, which de-frames the data from the signal according to the particular protocol used in the optical transmission, and provides output data. The data output may be, for example, a user or any receiving system.

These components may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

Figure 4:
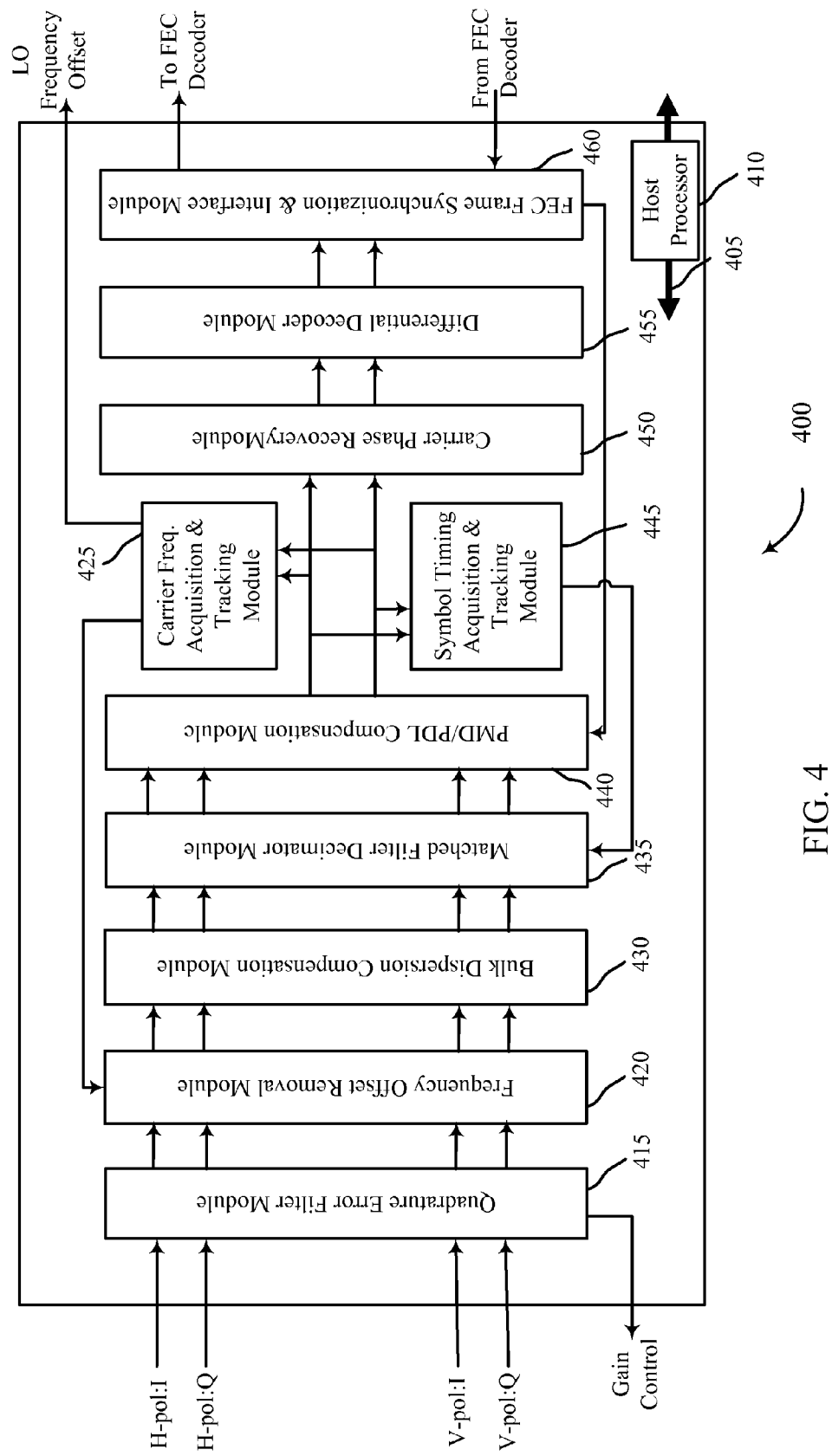
FIG. 4 is a block diagram of a demodulator unit according to various embodiments of the disclosure.

Referring now to FIG. 4, a demodulator unit 400 is described. This may be the demodulator unit 310 of FIG. 3. In this example, two polarization components are received, one horizontal component (H) and one vertical component (V). Each of the H and V components includes both an in-phase (I) component and a quadrature (Q) component. For reference, the two components in the horizontal polarization are referred to as HI (horizontal in-phase component) and HQ (horizontal quadrature component). Similarly, the two components in the vertical polarization are referred to as VI (vertical in-phase component) and VQ (vertical quadrature component). The demodulator unit 400 processes the digitized samples of the I and Q components of the two polarization components to recover the transmitted data. At the input, the demodulator unit 400 accepts the four parallel streams carrying HI, HQ, VI and VQ samples. In one embodiment, each stream contains multiple samples per clock. At its output the demodulator may provide demodulated hard-decision data (although in other examples, soft-decision data may be provided) to the FEC decoder module (e.g., FEC decoder module 315 of FIG. 3). The demodulator unit 400 may identify the beginning of an FEC frame. Additionally, in some embodiments the demodulator unit 400 receives feedback signals from the FEC decoder module 315 regarding the convergence status for error correction.

In some embodiments, the demodulator unit 400 is implemented as an application specific integrated circuit (ASIC) that includes a number of functional modules. In such embodiments, the demodulator unit 400 may have a control and monitor interface bus 405 connected to a host processor 410 allowing for configuration of demodulator parameters (filter coefficients, loop gains, etc.) and extraction of demodulator status. With continuing reference to FIG. 4, several of the sub-modules within the demodulator unit 400 of various embodiments are described. In this embodiment, a quadrature error filter (QEF) module 415 provides a collection of data formatting, error detection and correction functions. In one embodiment, input data samples are expected to be in binary-offset/offset-binary format and are converted to a two's complement (2C) format for processing within a digital signal processor. The incoming HI, HQ, VI and VQ streams, in some embodiments, also may be independently swapped and inverted if needed, allowing for any design issues that might translate into an accidental inversion or IQ swap. Each data stream of these various embodiments may be processed to remove polarization skew (between H and V poles) as well as I-Q skew within a pole. The QEF module 415 may provide for detection and removal of four types of quadrature signal errors: I/Q Skew, DC bias, I/Q amplitude imbalance, and I/Q phase imbalance. All four error detectors may be independently enabled or disabled, in some embodiments, via the processor interface, and the detected error values are output as status values via this same interface. The QEF module 415 may also output a gain control signal that may be used by other components of the system.

The QEF module 415 is connected to a frequency offset removal module 420. The frequency offset removal module 420 in one example performs a frequency rotation on the data samples coming out of the QEF module 415. The amount of frequency rotation is controlled by a frequency error input that is sourced by a carrier frequency acquisition and tracking (CFAT) module 425. Such frequency offset removal function may remove residual frequency left from the LO laser tuning in the optical domain. A bulk dispersion compensation module 430 removes bulk chromatic dispersion from the horizontal and vertical polarization channels. The compensation may be applied via a filter in the frequency domain. The amount of correction may be controlled by the chromatic dispersion filter inputs that are derived outside of the demodulator module 400 and provided via the host processor 410 and control and monitor interface bus 405, in this embodiment.

A matched filter decimator (MFD) module 435 may implement an interpolation function that provides decimation on samples taken at two+ϵ times the symbol rate. In one embodiment, each of the four data streams has an independent bank of FIR filters with selected coefficients. The incoming data is processed through the filter banks to produce two samples per symbol out for each data stream. Data samples are gathered and assembled into blocks of fixed number of samples per stream per clock by a sample block assembler. The assembly function may be identical for the I and Q streams in each polarization so one assembly block may service two streams. A PMD/PDL compensation module 440 may utilize adaptive equalization to compensate for cross-polarization interference, IQ channel interference, adjacent symbol interference introduced by PMD and PDL in optical channel and other residual impairments, such as residual chromatic as mentioned above. On one embodiment, an adaptive equalizer takes in data at one or two samples/symbol from the MFD and processes the data through a bank of FIR filters with adaptive filter tap coefficients. In other embodiments, PMD/PDL compensation module 440 includes modules configured to determine filter characteristics such as a center of mass for the filter taps, and compensate for any drift in the center of mass through adjustment of the filter taps. Other embodiments may update and/or re-initialize filter taps based o characteristics of the signals output from the filter, such as timing offset information and signal identification information.

In some embodiments, a symbol timing acquisition and tracking (STAT) module 445 may estimate symbol timing using an early/late symbol radius matching scheme and PI controller, and generate an error signal to correct symbol timing. This STAT module 445, in an embodiment, also has a symbol timing lock detection mechanism that outputs a symbol lock indicator. In various embodiments, there are two sets of gains for the PI controller (wide band for acquisition and narrow band for tracking). When not in timing lock, the wideband gains may be used, otherwise, the narrowband gains may be used. The STAT module 445 may perform symbol timing acquisition and tracking on a portion of the optical signal after the PMD/PDL compensation module 440 compensates for interference caused by PMD and PDL and before carrier phase recovery on the portion of the optical signal.

The CFAT module 425 may be responsible for acquiring, as well as tracking, carrier frequency. Carrier frequency acquisition is achieved using one of a number of techniques, such as through fast Fourier transform (FFT) with appropriate averaging and peak frequency component detection. The CFAT module 425 may provide a frequency error input to the frequency offset removal module 420. The CFAT module 425, in some embodiments, also provides local oscillator (LO) frequency offset output that may be used with data from the FEC frame synchronization and interface module 460. A carrier phase recovery (CPR) module 450 may use a feed-forward algorithm with a block phase estimator and a phase rotation function to remove residual frequency and phase errors. The CPR module 450 may operate on the on-time data samples produced by the PMD compensation module. A differential decoder module 455 may be responsible, in various embodiments, for accepting symbol streams from the CPR module 450 (e.g., at 1 sample per symbol). The differential decoder module 455 may be configured to differentially decode the signal and provide the decoded output (e.g., a hard-decision output data stream) to the FEC frame synchronization and interface module 460. The FEC frame synchronization and interface module 460 processes data to achieve frame synchronization, and may include three functional blocks for data alignment, frame sync detection, and clock transfer. The FEC frame synchronization and interface module 460 may be configured to skew, swap, and rotate received channels with respect to each other.

Figure 5:
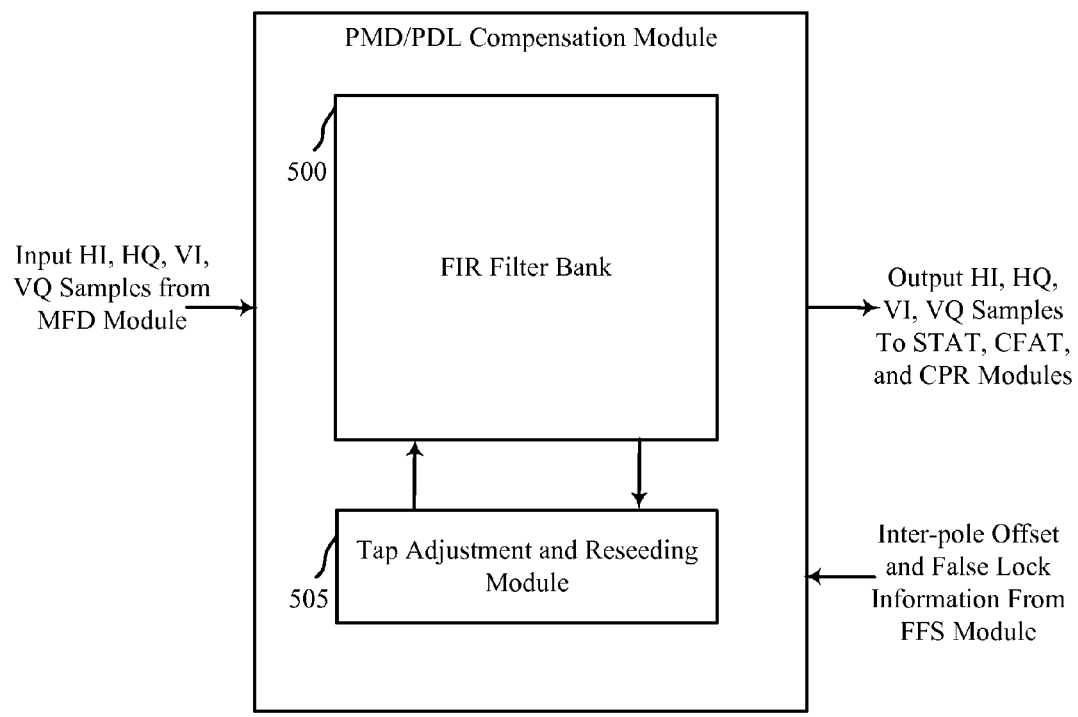
FIG. 5 is a block diagram of a polarization mode dispersion and polarization dependent loss compensation module according to various embodiments of the disclosure.

With reference now to FIG. 5, a block diagram of an example of a PMD/PDL compensation module 440-*a* is described. The PMD/PDL compensation module 440-*a* of FIG. 5 utilizes adaptive equalization to compensate for PMD, PDL, and miscellaneous residual impairments that translate into interference and/or undesired interaction between samples of the same channel/stream/tributary, samples of another channel in the same pole, or samples of other channels across both poles. In one embodiment, the PMD/PDL compensation module 440-*a* takes in data at two samples/symbol from the matched filter decimator (MFD) module 435 of FIG. 4, and processes the data through a bank of FIR filters 500 with adaptive filter taps/coefficients. The filter taps for the FIR filters 500 are set, in an embodiment, according to the output of a tap adjustment and reseeding module 505. Adaptive equalization may be accomplished, according to various embodiments, using a constant modulus algorithm (CMA) to generate updated filter taps for the FIR filters 500. In some embodiments, as will be described in more detail below, the tap adjustment and reseeding module 505 performs calculations and outputs tap updates to the FIR filters 500 based on a calculated center of mass of the filter taps of the FIR filters 500. The tap updates to the FIR filters 500 may shift the center of mass of the filter taps to be closer to the center of the filter. The tap adjustment and reseeding module 505 may also output information that may be used by STAT module 445 of FIG. 4, to add or remove symbols to/from the output to compensate, as needed, for corresponding shifts in the filter taps that occur as a result of tap updates provided to the FIR filters 500. The filtered output is sent from the PMD/PDL compensation module to the Symbol Timing Acquisition and Tracking (STAT) module 445, Carrier Frequency Acquisition and Tracking (CFAT) module 425, and Carrier Phase Recovery (CPR) module 450 of FIG. 4. The STAT module 445, in an embodiment, gets two samples (on-time and off-time) per symbol for half of the symbols, while the CFAT module 425 and CPR module 450 get 1 sample (on-time) per symbol for all the symbols.

Figure 6:
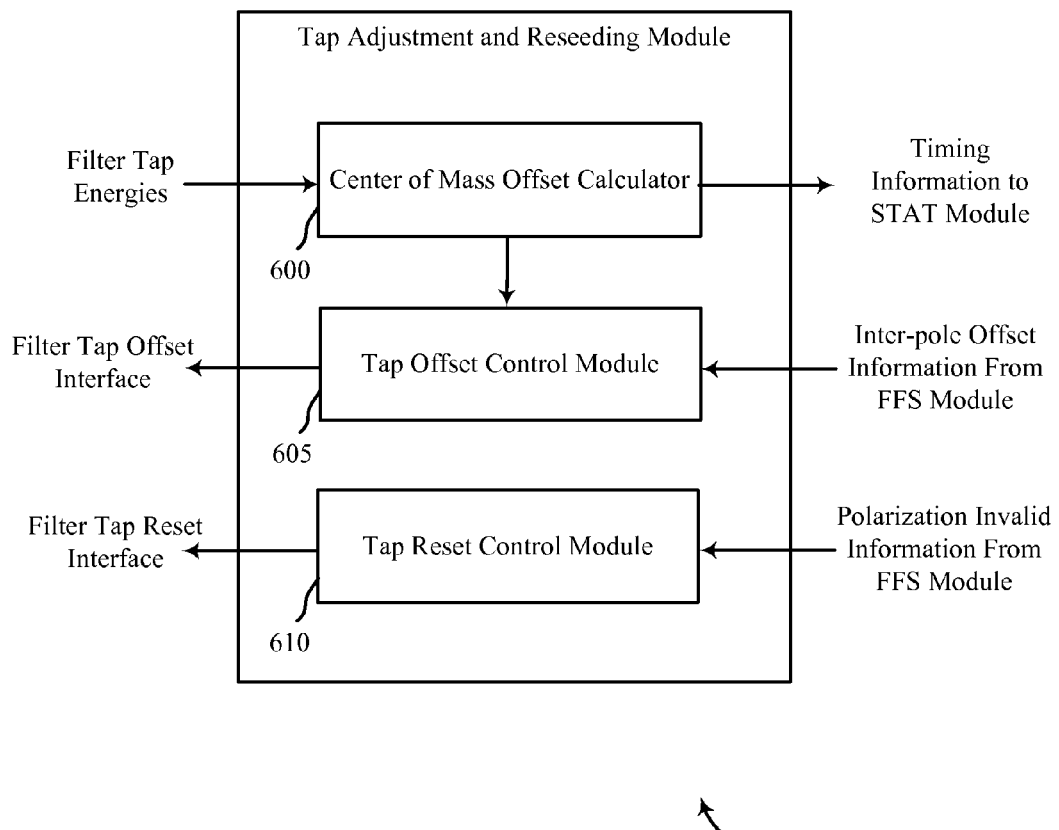
FIG. 6 is a block diagram of a tap adjustment and reseeding module according to various embodiments of the disclosure.

FIG. 6 is a block diagram illustration of a tap adjustment and reseeding module 505-a according to various embodiments. This may be an example of the tap adjustment and reseeding module 505 of FIG. 5. The tap adjustment and reseeding module 505-a of FIG. 6 may include a center of mass calculator 600 that performs center of mass related offset and error calculations, a tap offset control module 605 that outputs updated tap values, and a tap reset control module 610 that resets output signals to reset or re-initialize filter taps of FIR filters 500 of FIG. 5. The center of mass offset calculator 600 receives filter tap energies from FIR filters 500. The filter tap energies may include current tap values for filter taps of FIR filters. The filter tap energies, in an embodiment, are received from separate sets of FIR filters, namely positive and negative tap values for the FIR filters, thus the filter tap energies include a subset of tap energies for the positive filter taps and a subset of tap energies for the negative filter taps. In some embodiments, the filter tap energies include a set of tap energies corresponding to horizontal polarity signal filters, and a second set of tap energies corresponding to vertical polarity signal filters. Each of the sets of taps for horizontal and vertical polarity signals include subsets of positive and negative taps. It will be recognized that positive and negative taps are determined in relation to an axis point of the filter taps, such as a center tap of the filter taps. Negative taps are located on a first side from the axis point, and positive taps are taps located on a second side from the axis point. A center of mass may be determined for sets of filter taps based on the combined tap energies of the positive and negative subsets of taps. Ideally, the center of mass in such a filter will be approximately the axis point of the filter.

The center of mass offset calculator 600 receives the filter energies and generates outputs that may help counter the movement of the center of mass away from the axis point. The center of mass offset calculator 600 of this embodiment determines if the combined energies of the sets of filter taps are unbalanced and, if the combined energies are unbalanced by greater than a predetermined threshold, generates an update to the tap values to bring the combined tap energies of the two sets of taps more into balance. Thus, if a filter is drifting such that the center of mass of the filter, as measured by the combined tap energies of the two subsets of taps, is offset from the axis point, the center of mass offset calculator 600 may generate outputs that help re-center the center of mass. In one embodiment, the filter includes a number of FIR filter modules and includes a number of filter taps, with the taps shifted toward or away from the axis point to move the center of mass of the filter in the desired direction. The outputs of the center of mass offset calculator 600 are provided to the tap offset control module 605, which receives the outputs and outputs updated tap values to the filter taps through a filter tap offset interface.

The tap offset control module 605 of this embodiment also receives timing information related to the inter-pole offset between horizontal and vertical polarity signals output from the filter, such as FIR filter module 500 of FIG. 5. This timing offset information may indicate that one of the poles is being received before or after the signal from the other pole. In one embodiment, FFS module 460 of FIG. 4 provides information related to the timing of receipt of the horizontal and vertical polarity signals. When a signal is initially acquired, the adaptive PMD filter will filter the received channels and converge on a set of filter tap values that are then adjusted as the channel conditions of the optical transport fiber change. In order to allow enhanced ability to adjust the filter taps to compensate for a relatively wide range of channel conditions, it would be beneficial for the filter taps to be set such that when there is little or no timing offset between the two polarity signals the filter taps are at or near the center of the filter's range of adjustment. In one embodiment, as will be described in more detail below, when tap offset control module 605 the receives timing information that indicates a relatively large inter-pole timing offset, the filter taps are adjusted to provide that the filter will be relatively centered when the inter-pole timing offset is at or near zero. In this manner, the filter will have greater ability to compensate for a relatively wide range of channel conditions.

Tap adjustment and reseeding module 505-a also includes a tap reset control module 610 that, according to various embodiments, may re-initialize filter taps in the event that the filter converges and outputs two versions of the same polarity signal. Such a situation may occur when the channel conditions result in a rotation of each of the poles of the optical signal such that both poles are rotates by about 45 degrees, for example. In such a situation, the filter outputs for both the horizontal and vertical polarity signals may converge to output the same signal, such as both outputs providing a filtered vertical polarity signal. The tap reset control module 610 receives an indication of such a condition through a polarization invalid information signal from the FFS module 460 of FIG. 4. When this signal is received, as will be described in more detail below, the tap reset control module 610 may re-initialize the filter taps for one of the polarities and allow the filter to re-converge. The filter may then converge to output the correct polarity signal. In the event that the filter converges on the incorrect pole again, the filter taps may again be re-initialized, until the filter converges to the correct signal. In some embodiments, the tap reset control module 610 re-initializes the filter taps associated with one of the polarity signals to an initial or default value. In other embodiments, the tap reset control module 610 re-initializes the filter taps associated with one of the polarity signals based on the tap values for the other polarity signal, thus increasing the likelihood that the filter will properly converge on the correct polarity signal.

Figure 7:
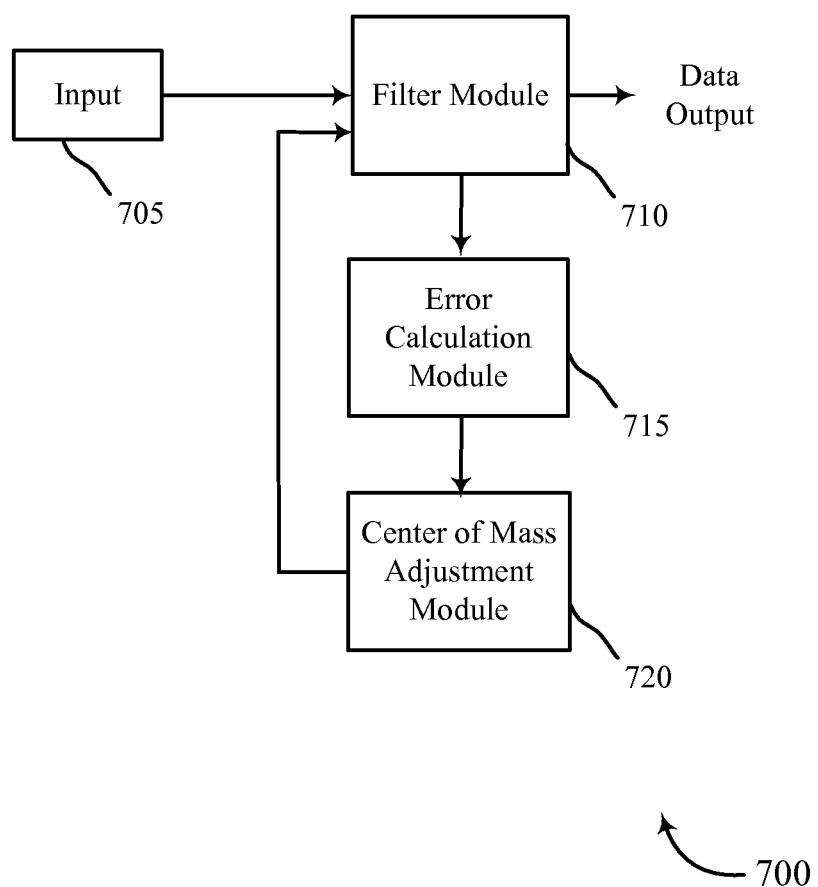
FIG. 7 is a block diagram of a center of mass adjustment circuit according to various embodiments of the disclosure.

With reference now to FIG. 7, a block diagram of a center of mass adjustment system 700 is described. This may be integrated into the tap adjustment and reseeding module 505 of FIG. 5 of FIG. 5 or 6. In this embodiment, an input 705 provides multiple input channels corresponding to digitized versions received optical signals. In some embodiments, the input 705 provides input channels corresponding to in-phase and quadrature channels of horizontal and vertical polarity optical signals. A filter module 710 receives the input channels and provides a filtered data output. In some embodiments, the filtered output is a PMD compensated output of the received input channels. The filter module 710 may include a FIR filter such as FIR filter bank 500 of FIG. 5. In some embodiments, the filter module 710 includes a number of filters that have sets of filter taps, with a tap value associated with each filter tap determining filter coefficients for the filter module 710. In embodiments where the input 705 provides digitized versions of dual polarity signals, a set of the filters, and associated filter taps, are associated with a horizontal polarity signal, and a second set of the filters and filter taps are associated with a vertical polarity signal. Each set of filters may include a number of filter taps that are centered about an axis point or midpoint of the taps, with a subset of the taps being positive taps, and a second subset of the taps being negative taps.

An error calculation module 715 is coupled with the filter module and is configured to receive information from the filter module 710 related to the tap energies associated with the filter taps that are used to filter the input channels. The error calculation module 715 may be included in tap adjustment and reseeding module 505 of FIG. 5, or center of mass offset calculator 600 of FIG. 6, for example. The error calculation module 715 determines combined tap energies for each of the first and second subsets of taps, the center of mass of the filter defined by a relationship between the combined tap energies for the first and second subsets of filter taps. The combined tap energies are provided to center of mass adjustment module 720. Center of mass adjustment module 720 may be included in tap offset control module 605 of FIG. 6. The center of mass adjustment module 720 compares the combined tap energies of the subsets of taps and determines if one set of taps has combined tap energies significantly greater than the other set of taps. If one set of taps has a higher combined tap energy, this may indicate that the center of mass has drifted away from the axis point, and the center of mass adjustment module 720 shifts the center of mass when the difference of combined tap energies exceeds a predetermined threshold. In some embodiments, the center of mass adjustment module 720 shifts the filter taps toward or away from the axis point when it is determined that the center of mass has drifted from the axis point. Such an action effectively shifts the center of mass of the filter towards the center of the filter, and provides enhanced ability to continue to compensate received signals as channel conditions associated with the optical signals change.

Figure 8:
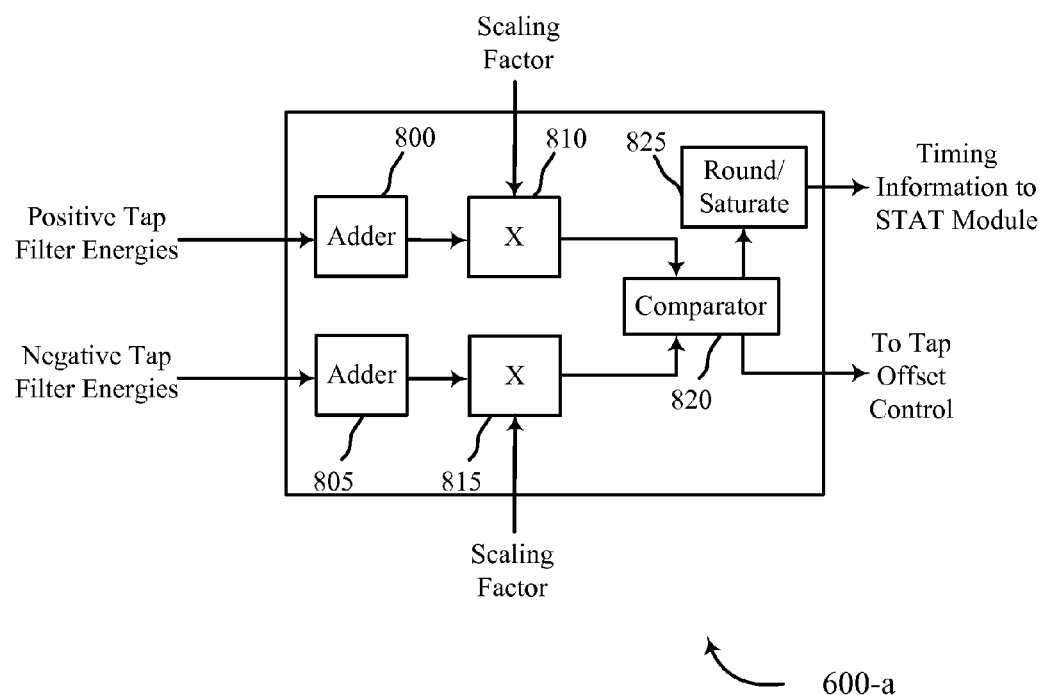
FIG. 8 is a block diagram of a center of mass offset calculator according to various embodiments of the disclosure.

With reference now to FIG. 8, a block diagram of an embodiment of a center of mass offset calculator 600-*a* is described. In this embodiment, positive tap filter energies are provided to an adder 800, and negative tap filter energies are provided to adder 805. Adders 800 and 805 add the energies of each of the associated taps to generate a raw combined tap energy for the associated filter taps. In some embodiments, the adders 800 and 805 add magnitudes of the tap filter energies to provide a total magnitude of combined filter energies. In other embodiments, the adders first square the energy associated with each tap and then add the squared energies together to provide a combined tap energy for the associated filter taps. The positive and negative raw combined tap energies are scaled at multipliers 810 and 815 by a pole-dependent scaling factor. The pole-dependent scaling factors account for any PDL related mismatch between the two poles and are provided by FFS module 460 in one embodiment. The scaled results are compared at comparator 820 which generates a signal to indicate whether the difference in combined tap energies of the sets of filter taps exceed a predetermined threshold, that is used to adjust filter tap values. A rounding/saturating module 825 of this embodiment outputs a signal going out to the STAT module 445 of FIG. 4. The STAT 445 module may use this signal in addition to its own early-late symbol timing error signal to provide an aggregate error signal to the MFD for symbol timing adjustment. The output of comparator 820, in an embodiment, is a 2-bit offset indicator that goes out to the tap offset control module 605 or center of mass adjustment module 720. This will result in the shifting the center of mass of the filter.

Figure 9:
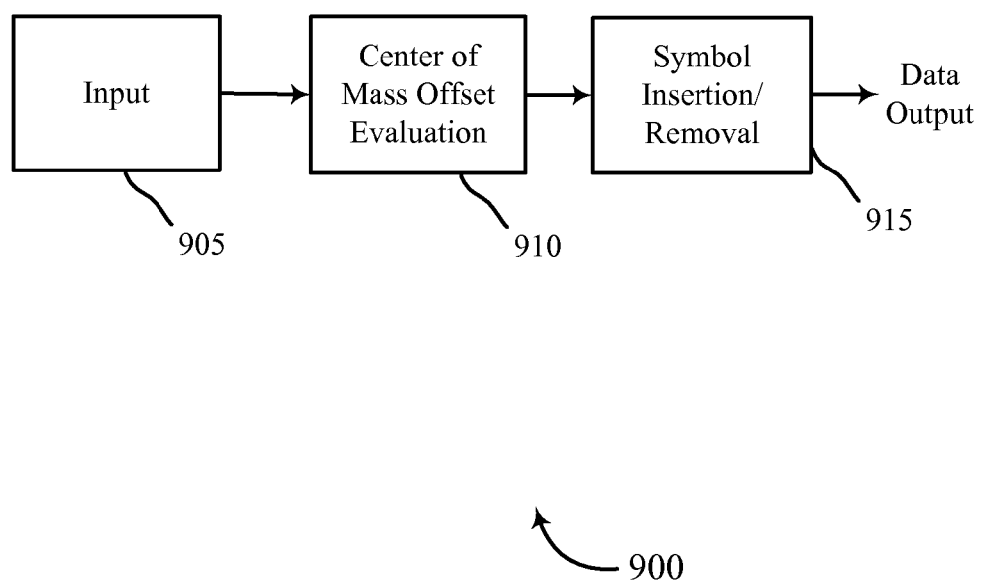
FIG. 9 is a block diagram of a center of mass offset evaluation and symbol timing circuit according to an embodiment of the disclosure.

With reference now to FIG. 9, a symbol timing update circuit 900 is discussed. In this embodiment, input 905 is provided to center of mass offset evaluation module 910. Input 905 may be the filter tap energies such as provided to center of mass offset calculator 600 of FIG. 6, to error calculation module 715 of FIG. 7, or to adders 800, 805 of FIG. 8. Center of mass offset evaluation module 910 determines if the combined tap energies of one set of filter taps exceeds tap energies of another set of filter taps by a predetermined threshold, such as described above with respect to FIG. 6, 7, or 8, and outputs a signal to symbol insertion/removal module 915. Symbol insertion/removal module 915 receives the signal from center of mass offset evaluation module 910 and uses the signal for symbol timing adjustment in order to compensate for a corresponding shift in filter taps that results from the filter tap adjustments made to correct the filter center of mass. The symbol insertion/removal module 915 may be incorporated as part of the STAT 445 module of FIG. 4, for example. In such a manner, symbol timing is maintained when filter taps are adjusted to correct the center of mass of the filter. Similarly as described above, filter taps for the filters may be shifted toward or away from the axis point, which would result in an addition of a symbol in the output data, or removal of a symbol in the output data. Thus, symbol insertion/removal module 915 may insert of remove a symbol to maintain correct symbol timing.

Figure 10:
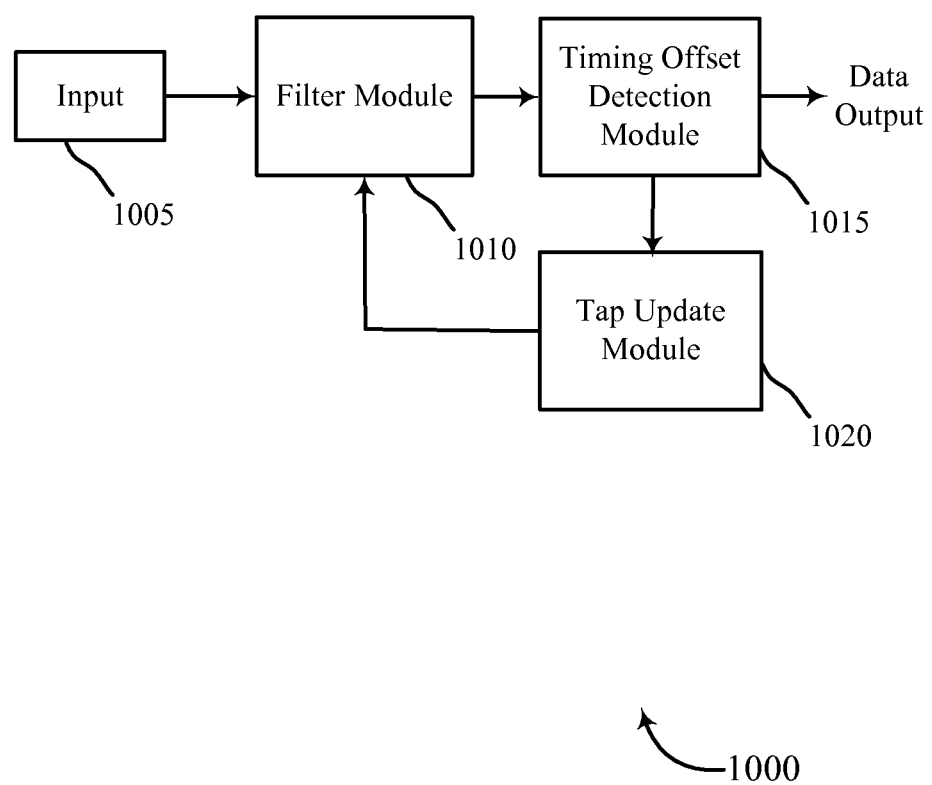
FIG. 10 is a block diagram of a signal offset based tap update circuit according to various embodiments of the disclosure.
Figure 11:
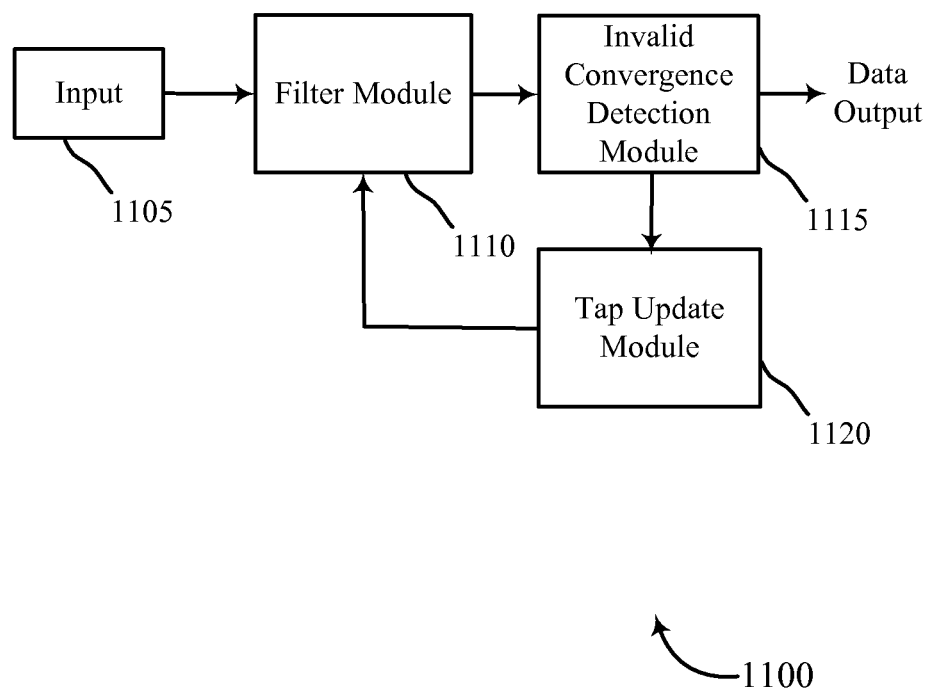
FIG. 11 is a block diagram of an invalid channel convergence based tap update circuit according to various embodiments of the disclosure.

With reference now to FIG. 10, a timing offset compensation circuit 1000 of an embodiment is described. Timing offset compensation circuit 1000 may be included in the adjustment and reseeding module 505 of FIG. 5, or tap offset control module 605 of FIG. 6, for example. In the embodiment of FIG. 11, an input 1005 receives multiple input channels corresponding to digitized versions of horizontal and vertical polarity optical signals, and provides the signals to filter module 1010. In some embodiments, the filtered output is a PMD compensated output of the received input channels. The filter module 1010 may include a FIR filter such as FIR filter bank 500 of FIG. 5. In some embodiments, the filter module 1010 includes a number of filters that have sets of filter taps, with a tap values associated with each filter tap determining filter coefficients for the filter module 1010. In embodiments where the input 1005 provides digitized versions of dual polarity signals, a set of the filters, and associated filter taps, are associated with a horizontal polarity signal, and a second set of the filters and filter taps are associated with a vertical polarity signal. Each set of filters may include a number of filter taps that are centered about a center tap or midpoint of the taps, with a subset of the taps being positive taps, and a second subset of the taps being negative taps.

A timing offset detection module 1015 is coupled with the filter module and configured to determine a timing offset between the horizontal and vertical polarity optical signals. Timing offset detection module 1015 may be incorporated in FFS module 460 of FIG. 4, for example. In one embodiment, timing offset detection module 1015 detects unique words encoded in each polarity optical signal. The unique words are inserted into the optical signals prior to transmission of the signals over an optical fiber, with unique words inserted into the horizontal and vertical polarity optical signals and each unique word transmitted at substantially the same time from the optical transmitter. The timing offset detection module 1015 determines a timing offset between unique words of each polarity signal and determines a timing offset between the horizontal and vertical polarity optical signals as received at input 1005. In some embodiments, the timing offset information may be represented by an integer number of symbols. When the filter module 1010 initially acquires each input channel, the filter taps of the filter module 1010 converge to a set of filter tap values that are then adjusted as the channel conditions of the optical transport fiber change. Tap update module 1020 receives timing offset information from timing offset detection module 1015. Tap update module 1020 may be included in tap adjustment and reseeding module 505 of FIG. 5, or tap offset control module 605 of FIG. 6, for example. In order to allow enhanced ability to adjust the filter taps to compensate for a relatively wide range of channel conditions, tap update module 1020 provides tap update information to filter module 1010 when timing offset information indicates that the horizontal and vertical polarity signals have a timing offset greater than a predetermined threshold. In embodiments where the timing offset information is represented by an integer number of symbols, the predetermined threshold may be any non-zero offset.

For example, the timing offset detection module 1015 may identify that the horizontal pole signal is three symbols ahead of the vertical pole signal. Upon initial convergence, the filter module 1010 may have filter taps that are well centered within the filter compensation range. However, when the horizontal and vertical polarity signals have a reduced timing offset, the filter taps will no longer be well centered within the filter compensation range. Thus, this timing offset that is present when filter module 1010 initially converges on the signals may result in the filter module 1010 having taps that are not properly centered. In one embodiment, the timing offset detection module 1015 determines if the timing offset exceeds a predetermined threshold, which may be any non-zero timing offset, as discussed above. Tap update module 1020 in such a case may adjust the filter taps to provide that, when the timing offset is reduced, the filter module 1010 operates closer to a center point of the filter compensation range. Thus, when the timing offset is present, the adjusted filter taps corresponding to one or more of the vertical or horizontal polarity signals may have an asymmetric distribution relative to a corresponding axis point, or center tap. This asymmetric distribution then becomes symmetric when the timing offset is substantially zero. In one embodiment, tap update module 1020 may request shifts of up to +/−3 symbols at a time. In some embodiments, tap update module 1020 also provides timing information to a symbol insertion/removal module, such as symbol insertion/removal module 915 of FIG. 9, in order to compensate for a corresponding shift in filter taps that results from the filter tap adjustments made to compensate for the timing offset.

With reference now to FIG. 11, an invalid convergence circuit 1100 of an embodiment is described. Invalid convergence circuit 1100 may be included in the adjustment and reseeding module 505 of FIG. 5, or tap reset control module 610 of FIG. 6, for example. In the embodiment of FIG. 11, an input 1105 receives multiple input channels corresponding to digitized versions of horizontal and vertical polarity optical signals, and provides the signals to filter module 1110. In some embodiments, the filtered output is a PMD compensated output of the received input channels. The filter module 1110 may include a FIR filter such as FIR filter bank 500 of FIG. 5. In some embodiments, the filter module 1110 includes a number of filters that have sets of filter taps, with a tap values associated with each filter tap determining filter coefficients for the filter module 1110.

Invalid convergence detection module 1115 is configured to determine that the filter module 1110 is outputting filtered signals corresponding to one of the multiple input channels, such as the vertical polarity optical signal. Such a situation may occur when the channel conditions result in a rotation of each of the poles of the optical signal such that both poles are rotated by about 45 degrees, for example. In such a situation, the filter outputs for both the horizontal and vertical polarity signals may converge to output the same signal, such as both outputs providing a filtered vertical polarity signal. This may be detected by the invalid convergence detection module 1115 through the identification of unique words that are encoded into each of the vertical and horizontal polarity optical signals. When the invalid convergence detection module 1115 detects the same unique word on both the horizontal and vertical polarity outputs of filter module 1110, a signal is sent to tap update module 1120. The tap update module 1120 may be included in the adjustment and reseeding module 505 of FIG. 5, or tap reset control module 610 of FIG. 6, for example. The tap update module 1120 receives the invalid convergence indication, and re-initializes the filter taps in filter module 1110 that are associated with one of the polarities. Following the tap re-initialization, the filter module 1110 is allowed to re-converge on the signal and invalid convergence detection module 1115 again determines if there is an invalid convergence. In the event that the filter module 1110 converges on the incorrect pole again, the filter taps may again be re-initialized, until the filter module 1110 converges to the correct signal.

In some embodiments, the tap update module 1120 re-initializes the filter taps associated with one of the polarity signals to an initial or default value. In other embodiments, the tap update module 1120 re-initializes the filter taps associated with one of the polarity signals based on the tap values for the other polarity signal, thus increasing the likelihood that the filter will properly converge on the correct polarity signal. For example, the tap update module 1120 may re-initialize the filter taps associated with the vertical polarity signal to have the same magnitude tap values, with opposite sign, as the tap values for the horizontal polarity signal. Setting the initial tap values in such a manner increases the likelihood that the filter module 1110 will properly converge on the vertical polarity signal. In still other embodiments, the tap update module 1120 re-initializes a subset of the filter taps associated with one of the polarity signals based on a subset of the tap values for the other polarity signal, thus increasing the likelihood that the filter will properly converge on the correct polarity signal. For example, the tap update module 1120 may re-initialize two or three selected filter taps associated with the vertical polarity signal to have tap values determined from corresponding tap values for the horizontal polarity signal. The remainder of taps for the vertical polarity signal are set to the default initial value. Setting the initial tap values in such a manner increases the likelihood that the filter module 1110 will properly converge on the vertical polarity signal.

In one specific example, the tap update module 1120 may re-initialize some subsets of filter taps based on the tap values of other subsets of filter taps, and re-initialize other subsets of filter taps to an initial or default value. In such an example, the filter module 1110 includes a set of component filters, namely a component filter for each of: HI to VI, HQ to VI, VI to VI, VQ to VI, HI to HQ, HQ to VQ, VI to VQ, and VQ to VQ. In this example, when an invalid convergence is detected, the component filters for one of the polarity signals are re-initialized according to a set of rules. In this example, the rules are that the HI to VI component filter is re-initialized to have tap values that are flipped and inverted relative to the tap values of the VI to HI component filter of the other polarity signal. The HQ to VI component filter is re-initialized to have tap values that are flipped and inverted relative to the tap values of the VI to HQ component filter of the other polarity signal. The VI to VI component filter is re-initialized to have a center tap value of one, and remaining tap values of zero. The VQ to VI component filter is re-initialized to have all tap values of zero. The HI to VQ component filter is re-initialized to have tap values that are flipped and inverted relative to the tap values of the VQ to HI component filter of the other polarity signal. The HQ to VQ component filter is re-initialized to have tap values that are flipped and inverted relative to the tap values of the VQ to HQ component filter of the other polarity signal. The VI to VQ component filter is re-initialized to have tap values that are all zeros. Finally, the VQ to VQ component filter is re-initialized to have a center tap value of one, and remaining tap values of zero. Such a re-initialization increases the likelihood that the filter module 1110 will properly converge on the respective horizontal or vertical polarity signal. When tap values are flipped, this refers to reversing the order of the taps of the respective filters (e.g., in a 16 tap filter the first tap value is set to correspond to the last tap value of the other filter). When tap values are inverted, the sign of the tap value is reversed.

Figure 12:
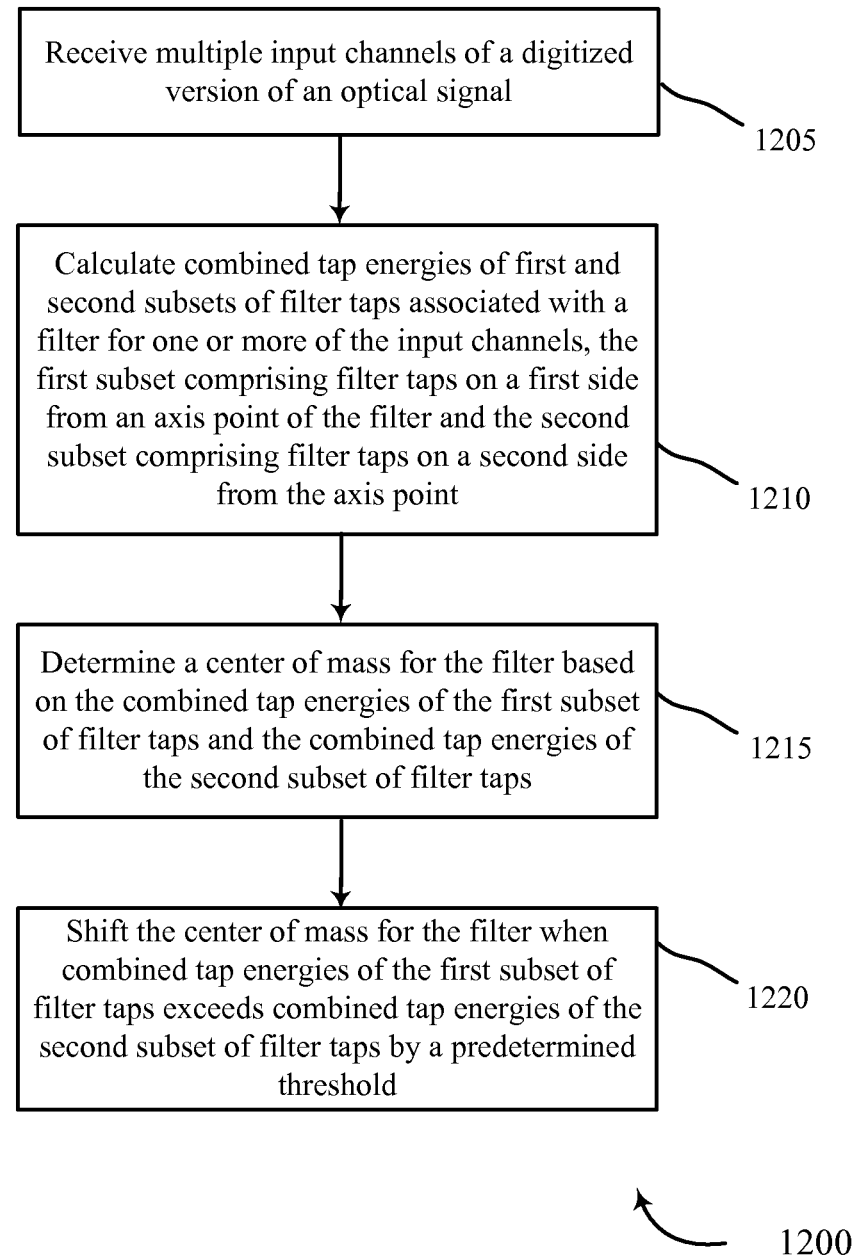
FIG. 12 is a flow chart of a method for compensating center of mass shifts in a digital filter according to various embodiments of the disclosure.

With reference now to FIG. 12, a flow chart diagram of the operational steps for center of mass compensation 1200 according to an embodiment are described. The method 1200 may be performed by the digital demodulation and decoding unit 125 of FIG. 1 or 3. More specifically, the method 1200 may be performed by the demodulator unit 310, 400 of FIG. 3 or 4, respectively, by the tap adjustment and reseeding module 505, 505-a of FIG. 5 or 6, respectively, or error calculation and center of mass adjustment modules 600-a and 715, 720 of FIG. 6 or 7, respectively.

Initially, according to block 1205, the system receives multiple input channels of a digitized version of an optical signal. The input channels may be filtered at a filter, the transfer function of the filter defined according to values of a number of taps associated with the filter. At block 1210, combined tap energies are calculated for first and second subsets of filter taps associated with a filter for one or more of the input channels, the first subset comprising filter taps on a first side from an axis point of the filter and the second subset comprising filter taps on a second side from the axis point. As discussed above, combined tap energies of subsets of filter taps that are located on opposite sides of the filter axis point may provide information related to whether the taps of the filter are drifting toward a filter edge. If taps are located toward a filter edge, the filter may be less effective to filter input signals in which channel conditions are variable. A comparison of the combined tap energies on each side of a filter's nominal midpoint may provide an indication of whether the filter taps need to be shifted relative to the filter midpoint.

Continuing with the operations of method 1200, a center of mass is determined based on the combined tap energies of the first subset of filter taps and the combined tap energies of the second subset of filter taps, at block 1215. Such a determination provides an indication that the filter has drifted off-center. The center of mass is shifted for the filter when combined tap energies of the first subset of filter taps exceeds combined tap energies of the second subset of filter taps by a predetermined threshold, according to block 1220. The center of mass is shifted, according to some embodiments, by shifting the filter taps of one, or both of the subsets of filter taps, toward or away from the axis point. Such an operation acts to shift the center of mass of the filter towards the center of the filter and thereby allow the filter to avoid drifting towards the filter edge.

Figure 13:
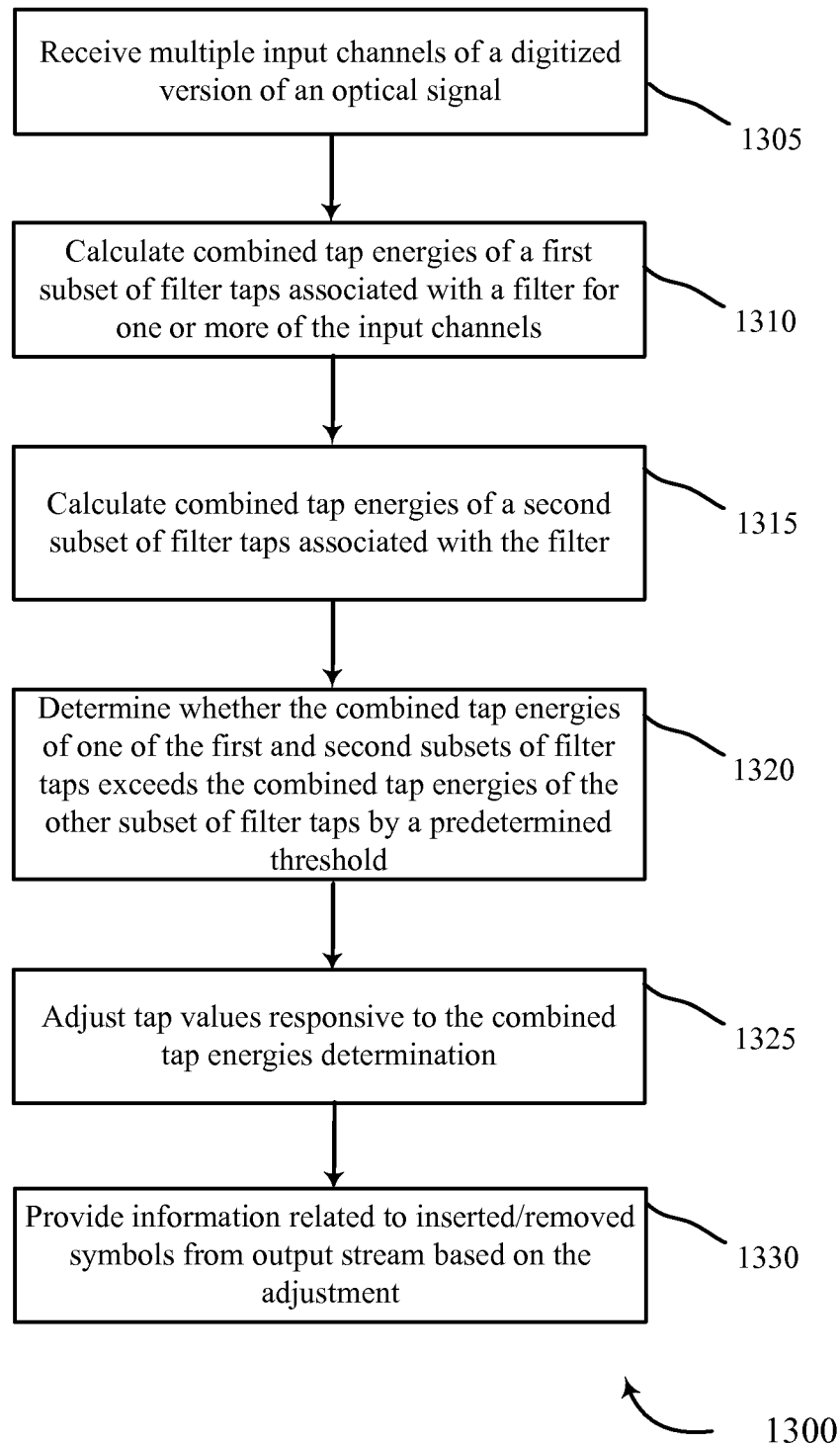
FIG. 13 is a flow chart of a method for compensating center of mass shifts in a digital filter and providing related timing updates according to various embodiments of the disclosure.

With reference now to FIG. 13, a flow chart diagram of the operational steps for center of mass compensation 1300 according to another embodiment are described. The method 1300 may be performed by the digital demodulation and decoding unit 125 of FIG. 1 or 3. More specifically, the method 1300 may be performed by the demodulator unit 310, 400 of FIG. 3 or 4, respectively, by the tap adjustment and reseeding module 505, 505-a of FIG. 5 or 6, respectively, or error calculation and center of mass adjustment modules 600-a and 715, 720 of FIG. 6 or 7, respectively.

Initially, according to block 1305, the system receives multiple input channels of a digitized version of an optical signal. At block 1310, combined tap energies are calculated for a first subset of filter taps associated with a filter for one or more of the input channels. At block 1315, combined tap energies are calculated for a second subset of filter taps associated with the filter. A determination is made whether the combined tap energies of the first subset of filter taps exceeds the combined tap energies of the second subset of filter taps by a predetermined threshold, at block 1320. As discussed above, combined tap energies of subsets of filter taps that are located on opposite sides of a filter axis point may provide information related to whether the taps of the filter are drifting toward a filter edge. If taps are located toward a filter edge, the filter will be less effective to filter input signals in which channel conditions are variable. A comparison of the combined tap energies on each side of a filter's nominal midpoint may provide an indication of whether the filter taps need to be shifted relative to the filter midpoint.

Tap values are adjusted responsive to the combined tap energies determination, according to block 1325. Filter tap values are updated, according to some embodiments, by shifting filter taps of one, or both of the subsets of filter taps, toward or away from the axis point. Such an operation acts to shift the center of mass of the filter towards the center of the filter and thereby allow the filter to avoid drifting towards the filter edge. Finally, at block 1330, information is provided related to symbols that are inserted or removed from output stream based on the adjustment. Similarly as described above, tap values for the filters may be adjusted, which results in an addition of a symbol in the output data, or removal of a symbol in the output data. Thus, symbol insertion or removal may be used to maintain correct symbol timing.

Figure 14:
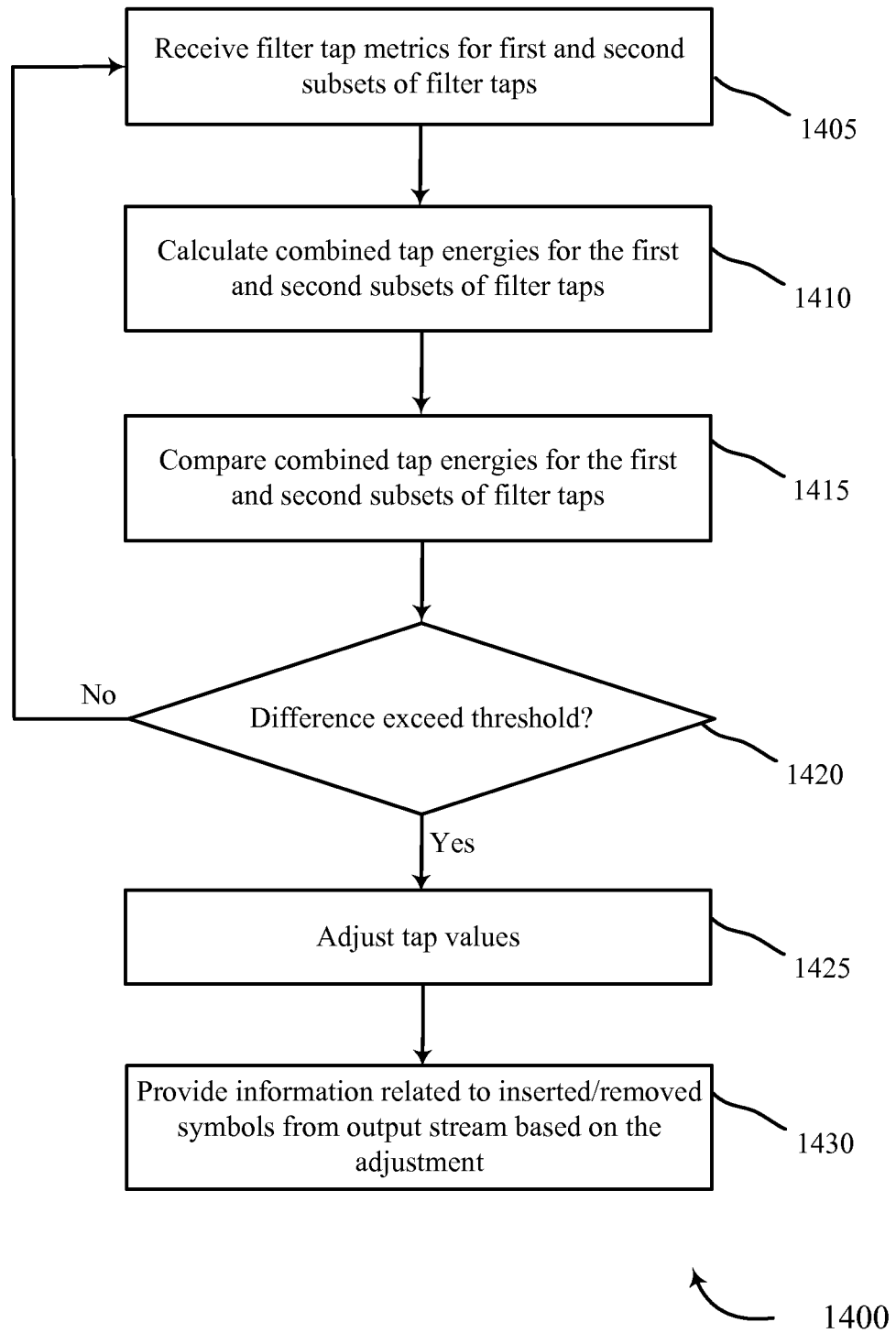
FIG. 14 is a flow chart of a method for compensating center of mass shifts in a digital filter and providing related timing updates according to various other embodiments of the disclosure.

With reference now to FIG. 14, a flow chart diagram of the operational steps for center of mass compensation and timing adjustment 1400 according to another embodiment are described. The method 1400 may be performed by the digital demodulation and decoding unit 125 of FIG. 1 or 3. More specifically, the method 1400 may be performed by the demodulator unit 310, 400 of FIG. 3 or 4, respectively, by the tap adjustment and reseeding module 505, 505-a of FIG. 5 or 6, respectively, or error calculation and center of mass adjustment modules 600-a and 715, 720 of FIG. 6 or 7, respectively.

Initially, according to block 1405, the system receives filter tap metrics for first and second subsets of filter taps. At block 1410, combined tap energies are calculated for the first and second subsets of filter taps. At block 1415, combined tap energies for the first and second subsets of filter taps are compared. As discussed above, combined tap energies of subsets of filter taps that are located on opposite sides of a filter axis point may provide information related to whether the taps of the filter are drifting toward a filter edge, and a comparison of the combined tap energies on each side of a filter's axis point, or nominal midpoint, may provide an indication of whether the filter taps need to be shifted relative to the filter midpoint. A determination is made at block 1420 whether a difference in the combined tap energies exceeds a threshold. If the difference in the combined tap energies does not exceed the threshold, operations are continues according to block 1405.

If the difference in the combined tap energies does exceed the threshold, tap values are adjusted responsive to the combined tap energies determination, according to block 1425. Filter tap values are updated, according to some embodiments, by shifting filter taps of one, or both of the subsets of filter taps, toward or away from the axis point. Such an operation acts to shift the center of mass of the filter towards the center of the filter and thereby allow the filter to avoid drifting towards the filter edge. Finally, at block 1430, information is provided related to symbols that are inserted or removed from the output stream based on the adjustment. Similarly as described above, tap values for the filters may be adjusted, which results in an addition of a symbol in the output data, or removal of a symbol in the output data. Thus, symbol insertion or removal may be used to maintain correct symbol timing.

Figure 15:
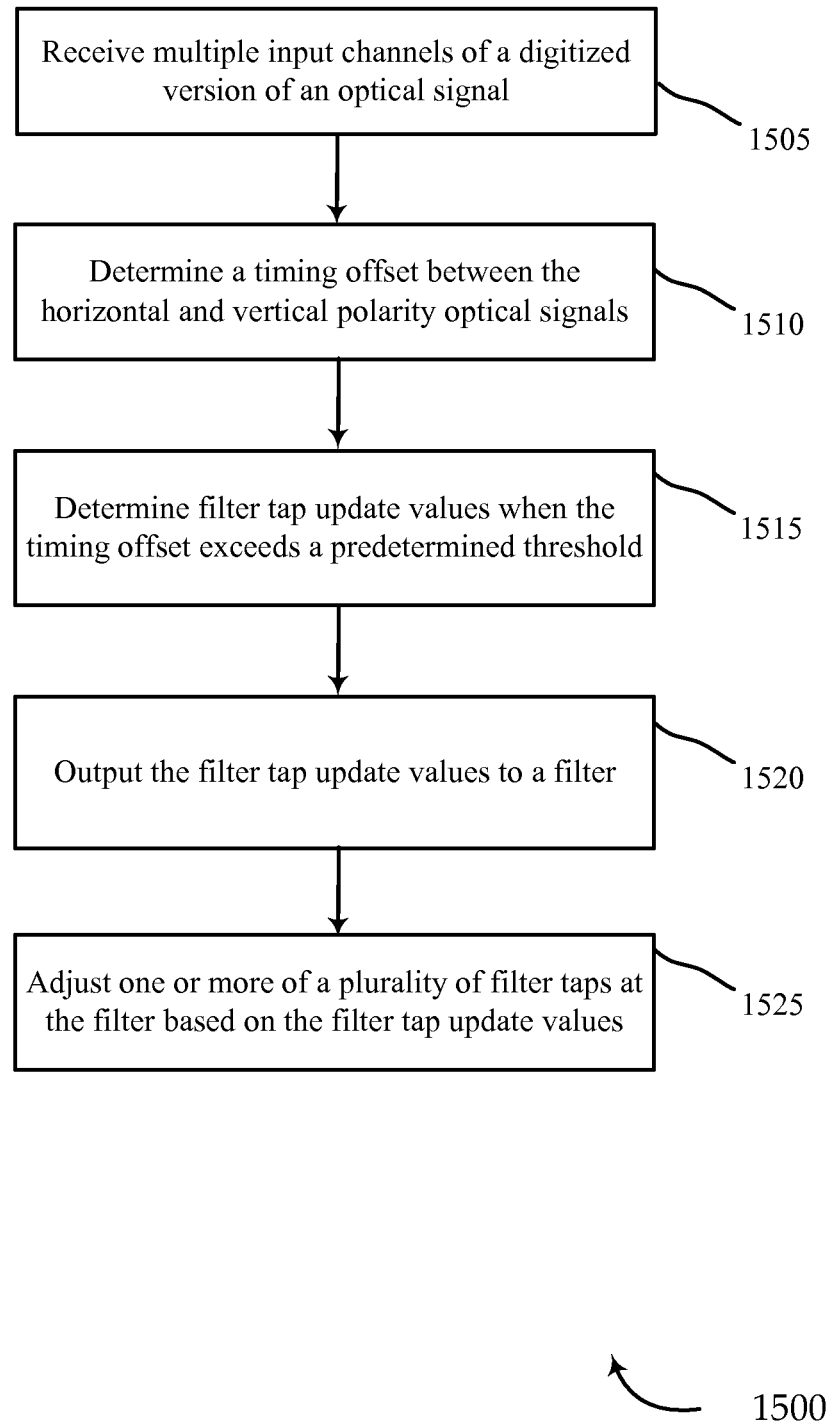
FIG. 15 is a flow chart of a method for compensating optical channel timing offsets in a digital filter according to various embodiments of the disclosure.

With reference now to FIG. 15, a flow chart diagram of the operational steps for timing offset detection and compensation 1500 according to an embodiment are described. The method 1500 may be performed by the digital demodulation and decoding unit 125 of FIG. 1 or 3. More specifically, the method 1500 may be performed by the demodulator unit 310, 400 of FIG. 3 or 4, respectively, by the tap adjustment and reseeding module 505, 505-*a* of FIG. 5 or 6, respectively, or timing offset detection and tap update modules 1015, 1020 of FIG. 10.

Initially, according to block 1505, the system receives multiple input channels of a digitized version of an optical signal. At block 1510, a timing offset between the horizontal and vertical polarity optical signals is determined. Timing offset may be determined based on a difference in reception time of unique words contained in each of the signals, similarly as described above. For example, analysis of unique words included in horizontal and vertical signal channels may indicate that the horizontal signal leads the vertical signal by two symbols. At block 1515, filter tap update values are determined when the timing offset exceeds a predetermined threshold. Such a predetermined threshold may be any non-zero timing offset, for example. Filter tap update values are output to a filter, at block 1520. One or more of a plurality of filter taps are adjusted at the filter based on the filter tap update values, according to block 1525. Thus, the filter taps are adjusted by an amount that corresponds to the timing offset, such that when the timing offset is at or near zero, the filter taps will be substantially centered. In such a manner, when the timing offset is present, the adjusted filter taps corresponding to one or more of the vertical or horizontal polarity signals may have an asymmetric distribution relative to a corresponding axis point, or center tap, with the asymmetric distribution becoming symmetric when the timing offset is substantially zero.

Figure 16:
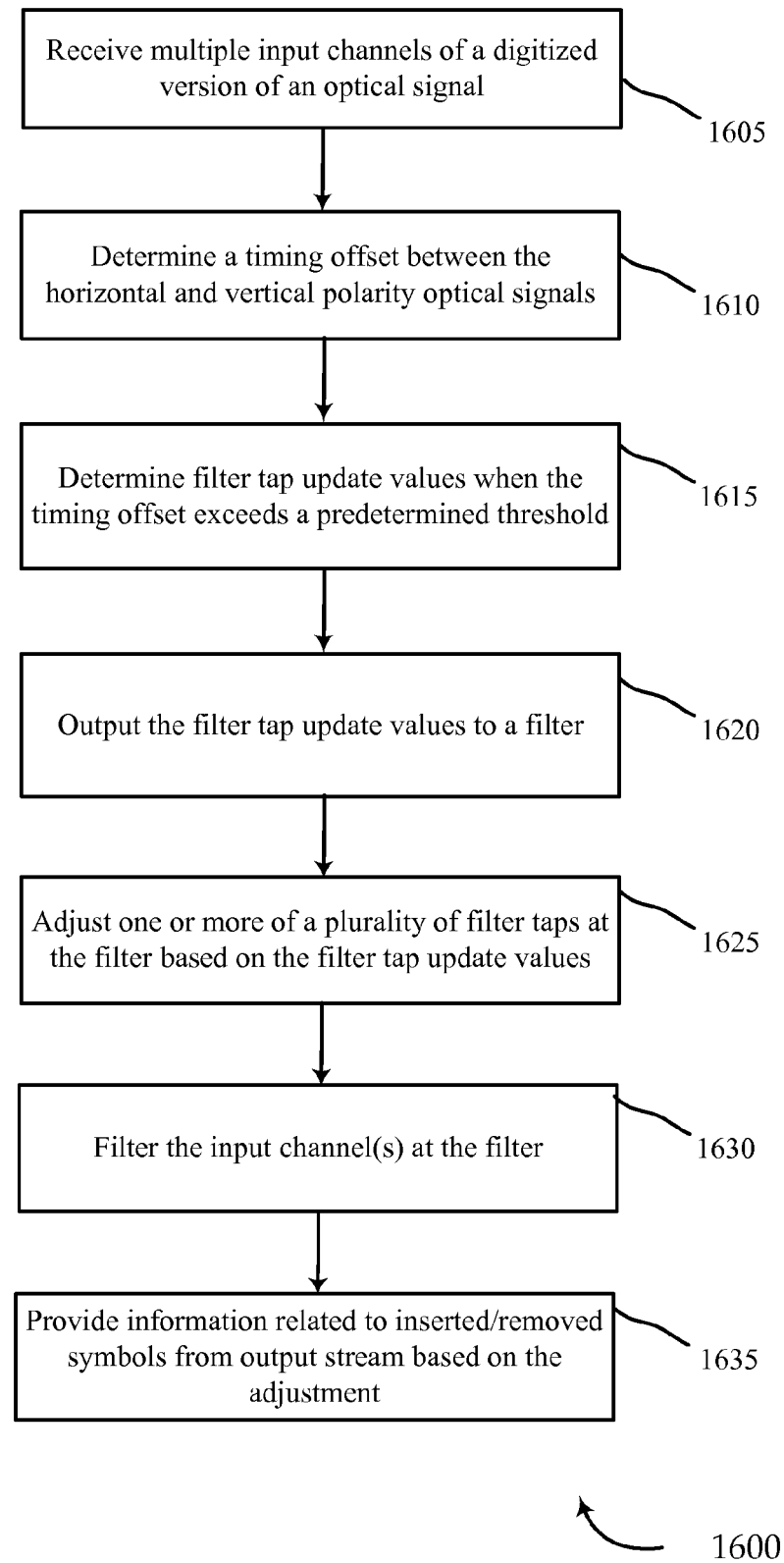
FIG. 16 is a flow chart of a method for compensating optical channel timing offsets in a digital filter and providing related timing updates according to various embodiments of the disclosure.

With reference now to FIG. 16, a flow chart diagram of the operational steps for timing offset detection and compensation 1600 according to an embodiment are described. The method 1600 may be performed by the digital demodulation and decoding unit 125 of FIG. 1 or 3. More specifically, the method 1600 may be performed by the demodulator unit 310, 400 of FIG. 3 or 4, respectively, by the tap adjustment and reseeding module 505, 505-*a* of FIG. 5 or 6, respectively, or timing offset detection and tap update modules 1015, 1020 of FIG. 10.

Initially, according to block 1605, the system receives multiple input channels of a digitized version of an optical signal. At block 1610, a timing offset between the horizontal and vertical polarity optical signals is determined. Timing offset may be determined based on a difference in reception time of unique words contained in each of the signals, similarly as described above. At block 1615, filter tap update values are determined when the timing offset exceeds a predetermined threshold. Such a predetermined threshold may be any non-zero timing offset, for example. Filter tap update values are output to a filter, at block 1620. One or more of a plurality of filter taps are adjusted at the filter based on the filter tap update values, according to block 1625. At block 1630, input channels are filtered at the filter according to the adjusted filter tap values. Finally, at block 1635, information is provided related to symbols that are inserted or removed from the output stream based on the adjustment. Similarly as described above, tap values for the filters may be adjusted to re-center the filter when an initial convergence results in the filter being off-center. Thus, when the timing offset is present the adjusted filter taps for a polarity may have an asymmetric distribution which becomes symmetric when the timing offset is substantially zero. The adjustment in tap values may result in an addition of one or more symbols in the output data, or removal of one or more symbols in the output data. Thus, symbol insertion or removal may be used to maintain correct symbol timing.

Figure 17:
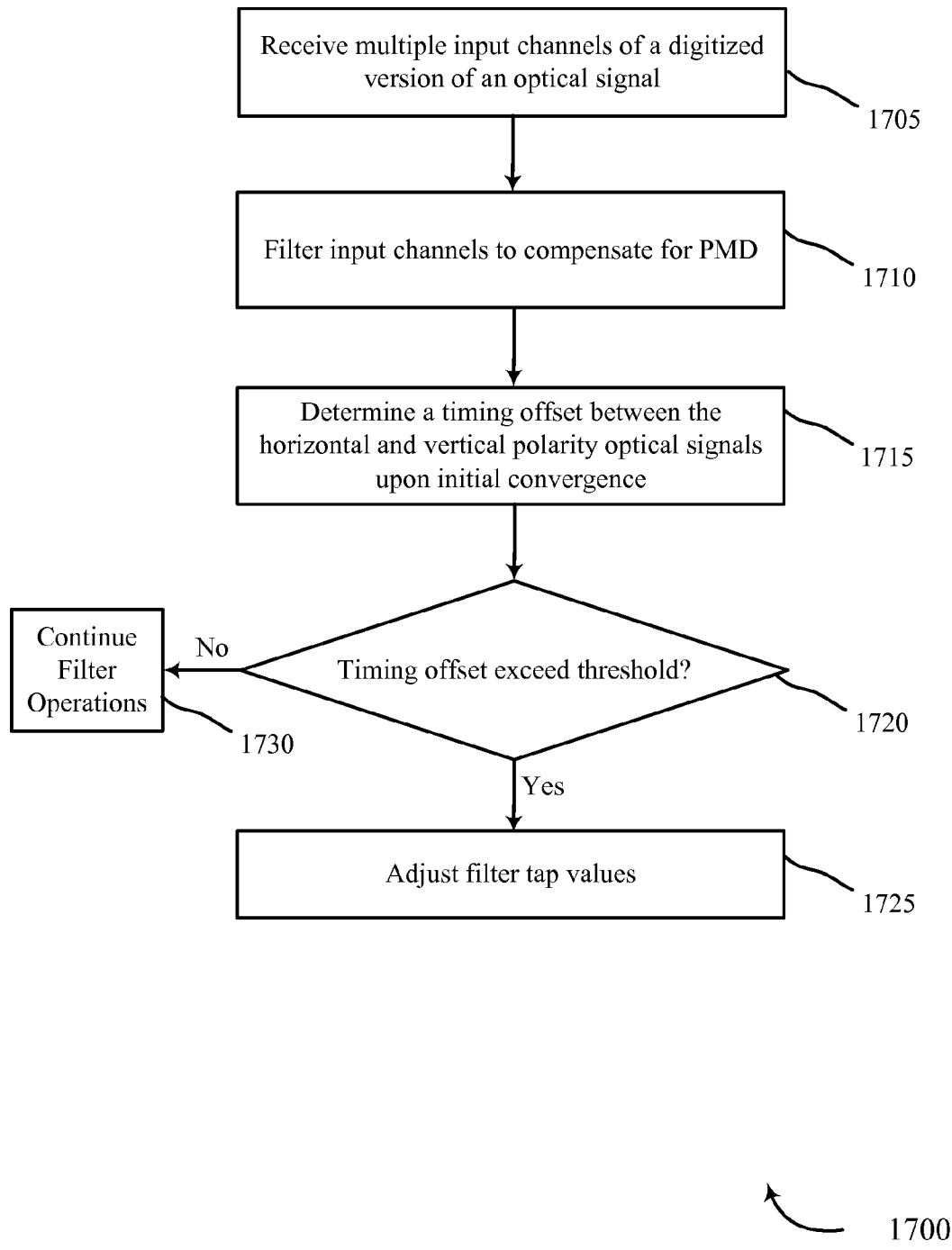
FIG. 17 is a flow chart of a method for compensating optical channel timing offsets in a digital filter according to various other embodiments of the disclosure.

With reference now to FIG. 17, a flow chart diagram of the operational steps for timing offset detection and compensation 1700 according to an embodiment are described. The method 1700 may be performed by the digital demodulation and decoding unit 125 of FIG. 1 or 3. More specifically, the method 1700 may be performed by the demodulator unit 310, 400 of FIG. 3 or 4, respectively, by the tap adjustment and reseeding module 505, 505-*a* of FIG. 5 or 6, respectively, or timing offset detection and tap update modules 1015, 1020 of FIG. 10.

Initially, according to block 1705, the system receives multiple input channels of a digitized version of an optical signal. At block 1710, the input channels are filtered to compensate for PMD. At block 1715, a timing offset between the horizontal and vertical polarity optical signals upon initial convergence is determined. It is determined if the timing offset exceeds a preset threshold, at block 720. Similarly as above, such a predetermined threshold may be any non-zero timing offset, for example. If the timing offset does exceed the threshold, filter tap values for the filter are adjusted, according to block 1725. Similarly as described above, tap values for the filters may be adjusted to re-center the filter when a timing offset between poles at initial convergence results in the filter being off-center. If it is determined at block 1720 that the timing offset does not exceed the threshold, filter operations are continued at block 1730 without adjustment to the filter tap values to compensate for timing offset.

Figure 18:
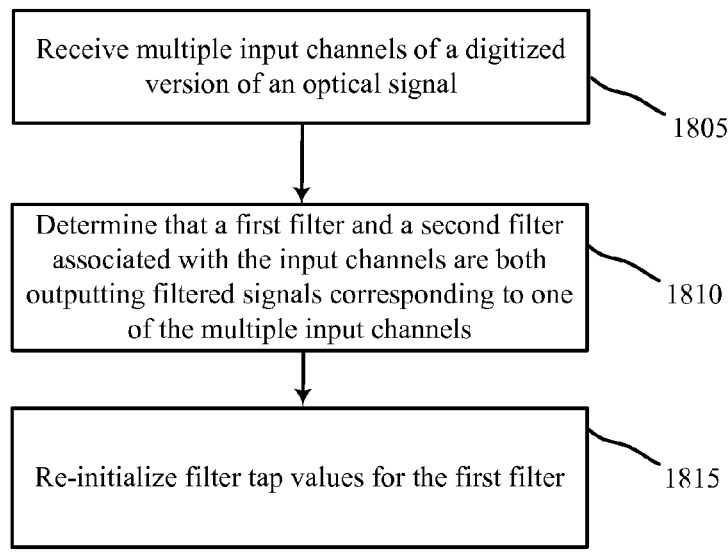
FIG. 18 is a flow chart of a method for compensating invalid optical channel convergence in a digital filter according to various embodiments of the disclosure.

With reference now to FIG. 18, a flow chart diagram of the operational steps for invalid convergence detection and compensation 1800 according to an embodiment are described. The method 1800 may be performed by the digital demodulation and decoding unit 125 of FIG. 1 or 3. More specifically, the method 1800 may be performed by the demodulator unit 310, 400 of FIG. 3 or 4, respectively, by the tap adjustment and reseeding module 505, 505-*a* of FIG. 5 or 6, respectively, or invalid convergence detection and tap update modules 1115, 1120 of FIG. 11.

Initially, according to block 1805, the system receives multiple input channels of a digitized version of an optical signal. At block 1810, a determination is made that a first filter and a second filter associated with the input channels are both outputting filtered signals corresponding to one of the multiple input channels. For example, it may be determined that both the horizontal polarity and vertical polarity outputs of the filters are outputting the same vertical polarity signal. Such a determination may be made, similarly as discussed above, by comparing unique words contained in each signal and verifying whether or not the unique words indicate the signals are generated from input channels having different polarities. At block 1815, filter tap values for the first filter are re-initialized. The filter tap values may be re-initialized to reset the filter taps associated with one of the polarity signals to initial or default values, or some other values, and the filter is allowed to re-converge. It is likely that the filter will re-converge to properly filter the other polarity signal, and if not the taps may be re-initialized again.

Figure 19:
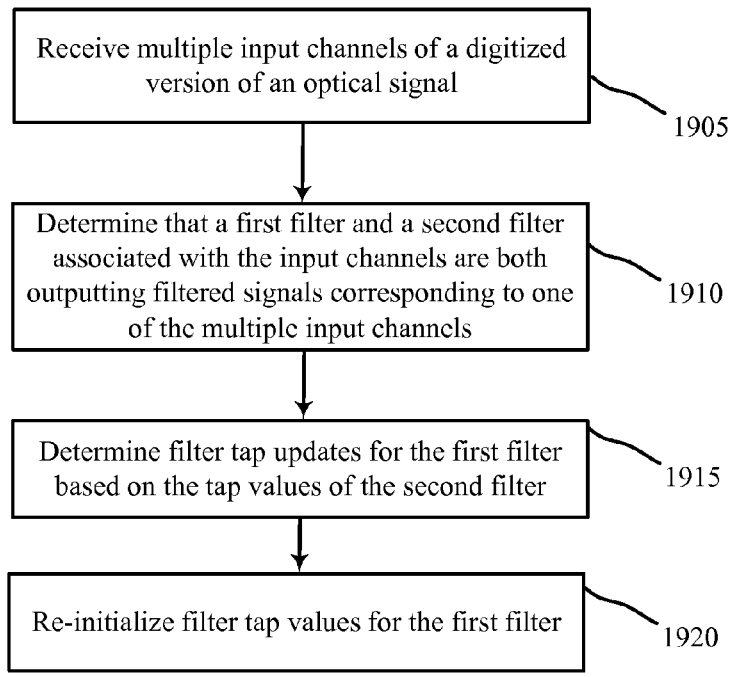
FIG. 19 is a flow chart of a method for compensating invalid optical channel convergence in a digital filter according to various other embodiments of the disclosure.

With reference now to FIG. 19, a flow chart diagram of the operational steps for invalid convergence detection and compensation 1800 according to an embodiment are described. The method 1900 may be performed by the digital demodulation and decoding unit 125 of FIG. 1 or 3. More specifically, the method 1900 may be performed by the demodulator unit 310, 400 of FIG. 3 or 4, respectively, by the tap adjustment and reseeding module 505, 505-*a* of FIG. 5 or 6, respectively, or invalid convergence detection and tap update modules 1115, 1120 of FIG. 11.

Initially, according to block 1905, the system receives multiple input channels of a digitized version of an optical signal. At block 1910, a determination is made that a first filter and a second filter associated with the input channels are both outputting filtered signals corresponding to one of the multiple input channels. For example, it may be determined that both the horizontal polarity and vertical polarity outputs of the filters are outputting the same vertical polarity signal. Such a determination may be made, similarly as discussed above, by comparing unique words contained in each signal and verifying whether or not the unique words indicate the signals are generated from input channels having different polarities. At block 1915, filter tap updates for the first filter are determined based on the tap values of the second filter. For example, if the first filter is a horizontal polarity filter, the filter tap updates for the vertical polarity filter may be determined based on the tap values of the horizontal polarity filter. At block 1920, filter tap values for the first filter are updated. Similarly as described above, the filter may then be allowed to re-converge. It is likely that the filter will re-converge to properly filter the other polarity signal, and if not the taps may be re-initialize again.

Figure 20:
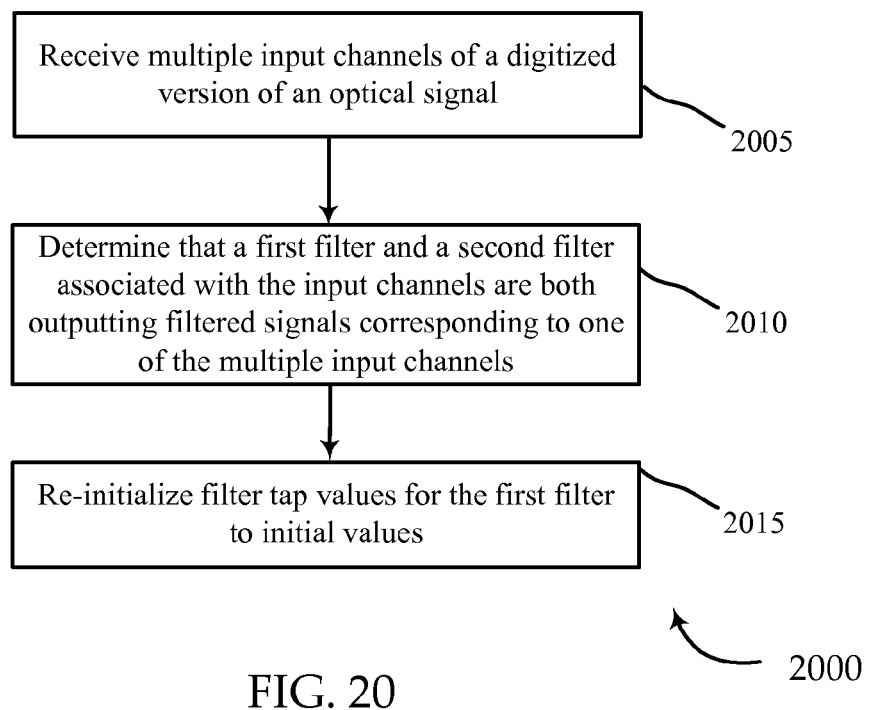
FIG. 20 is a flow chart of a method for compensating invalid optical channel convergence in a digital filter according to various other embodiments of the disclosure.

With reference now to FIG. 20, a flow chart diagram of the operational steps for invalid convergence detection and compensation 2000 according to another embodiment are described. The method 2000 may be performed by the digital demodulation and decoding unit 125 of FIG. 1 or 3. More specifically, the method 2000 may be performed by the demodulator unit 310, 400 of FIG. 3 or 4, respectively, by the tap adjustment and reseeding module 505, 505-*a* of FIG. 5 or 6, respectively, or invalid convergence detection and tap update modules 1115, 1120 of FIG. 11.

Initially, according to block 2005, the system receives multiple input channels of a digitized version of an optical signal. At block 2010, a determination is made that a first filter and a second filter associated with the input channels are both outputting filtered signals corresponding to one of the multiple input channels. For example, it may be determined that both the horizontal polarity and vertical polarity outputs of the filters are outputting the same vertical polarity signal. Such a determination may be made, similarly as discussed above, by comparing unique words contained in each signal and verifying whether or not the unique words indicate the signals are generated from input channels having different polarities. At block 2015, filter tap values for the first filter are re-initialized to their initial values. Similarly as described above, the filter is then allowed to re-converge. It is likely that the filter will re-converge to properly filter the other polarity signal, and if not the taps may be re-initialized again.

Figure 21:
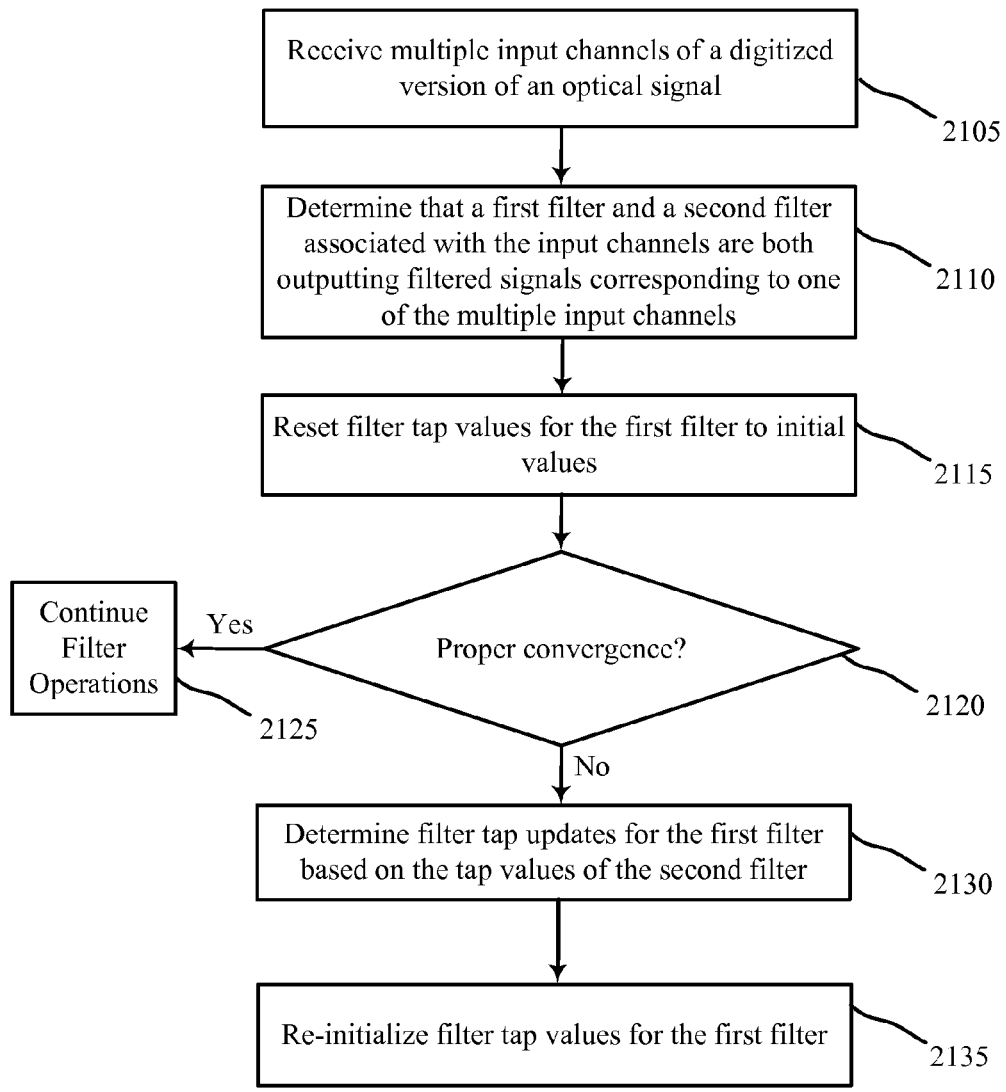
FIG. 21 is a flow chart of a method for compensating invalid optical channel convergence in a digital filter according to various other embodiments of the disclosure.

With reference now to FIG. 21, a flow chart diagram of the operational steps for invalid convergence detection and compensation 2100 according to another embodiment are described. The method 2100 may be performed by the digital demodulation and decoding unit 125 of FIG. 1 or 3. More specifically, the method 2100 may be performed by the demodulator unit 310, 400 of FIG. 3 or 4, respectively, by the tap adjustment and reseeding module 505, 505-*a* of FIG. 5 or 6, respectively, or invalid convergence detection and tap update modules 1115, 1120 of FIG. 11.

Initially, according to block 2105, the system receives multiple input channels of a digitized version of an optical signal. At block 2110, a determination is made that a first filter and a second filter associated with the input channels are both outputting filtered signals corresponding to one of the multiple input channels. For example, it may be determined that both the horizontal polarity and vertical polarity outputs of the filters are outputting the same vertical polarity signal. Such a determination may be made, similarly as discussed above, by comparing unique words contained in each signal and verifying whether or not the unique words indicate the signals are generated from input channels having different polarities. At block 2115, filter tap values for the first filter are re-initialized to initial values. At block 2120, it is determined if the first filter and second filter properly converged on different polarity signals. If the first filter and second filter have properly converged on different polarity signals, filter operations are continued according to block 2125.

If it is determined that the first filter and second filter did not properly converge on different polarity signals, filter tap updates are determined for the first filter based on the tap values of the second filter, according to block 2130. For example, if the first filter is a horizontal polarity filter, the filter tap updates for the vertical polarity filter may be determined based on the tap values of the horizontal polarity filter. At block 2135, filter tap values for the first filter are updated. Similarly as described above, the filter may then be allowed to re-converge. It is likely that the filter will re-converge to properly filter the other polarity signal, and if not the taps may be re-initialized again.

Figure 22:
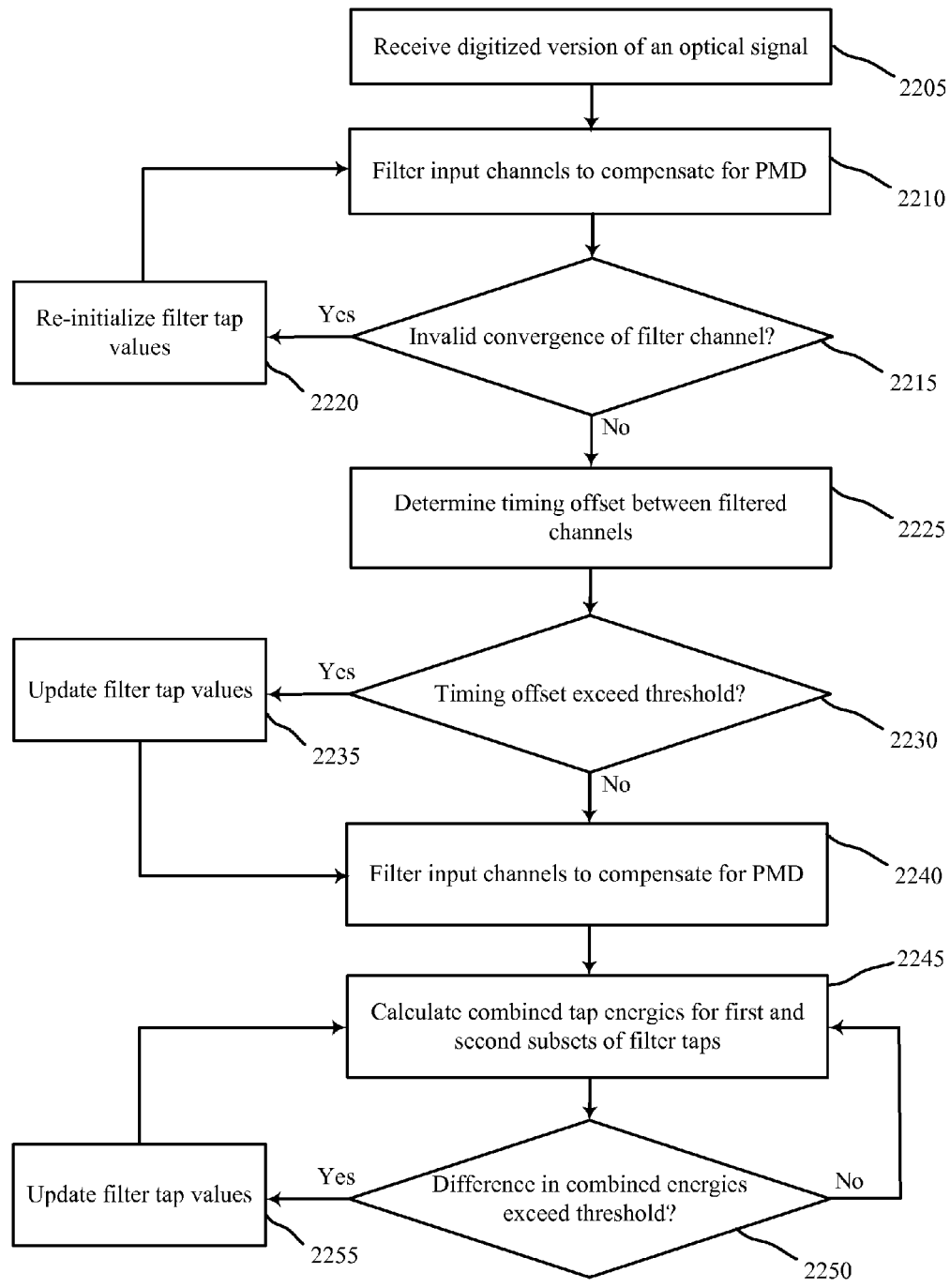
FIG. 22 is a flow chart of a method for compensating center of mass shifts, optical channel timing offsets, and invalid optical channel convergence in a digital filter according to various embodiments of the disclosure.

With reference now to FIG. 22, a flow chart diagram of the operational steps for filter tap adjustment and reseeding 2200 according to an embodiment is described. The method 2200 may be performed by the digital demodulation and decoding unit 125 of FIG. 1 or 3. More specifically, the method 2200 may be performed by the demodulator unit 310, 400 of FIG. 3 or 4, respectively, by the tap adjustment and reseeding module 505, 505-*a* of FIG. 5 or 6.

Initially, according to block 2205, a digitized version of an optical signal is received. The optical signal may, as discussed above, include multiple channels of a dual-polarity optical signal. At block 2210, input channels are filtered to compensate for PMD. The channels may be filtered at a PMD/PDL compensation module, such as module 440 or 44a-a of FIG. 4 or 5, respectively. As discussed above, when input channels are initially acquired and filtered, the filter will converge on an output and a set of tap values to achieve that output. At block 2215, it is determined if there is an invalid convergence of a filter channel. For example, it may be determined that both the horizontal polarity and vertical polarity filter outputs each contain the same vertical polarity signal. Such a determination may be made, similarly as discussed above, by comparing unique words contained in each signal and verifying whether or not the unique words indicate the signals are generated from input channels having different polarities. If it is determined that the filter convergence for one of the polarity signals is invalid, filter tap values are updated, as indicated at block 2220. The filter tap values may be updated to re-initialize the filter taps associated with one of the polarity signals to initial or default values, or some other values, and the filter is allowed to re-converge, and operations are continued according to block 2210.

If it is determined there was a valid convergence of filter channels at block 2215, then a timing offset between filtered channels is determined according to block 2225. Timing offset may be determined, similarly as described above, by evaluation of arrival times of unique words contained in the output filtered channels. A difference in arrival times of unique words that were encoded and transmitted at substantially the same time may be determined to be the timing offset. At block 2230 it is determined whether the timing offset exceeds threshold. If the timing offset between received input channels does exceed the threshold, filter tap values are updated, according to block 2235. Filter tap values may be updated to provide adjusted filter tap values that, when the timing offset is reduced, result in the filter operating closer to a filter center point. If it is determined that the timing offset does not exceed the threshold at block 2230, or after the filter tap values have been updated in block 2235, the input channels are filtered to compensate for PMD, as indicated at block 2240.

At block 2245, combined tap energies for first and second subsets of filter taps are calculated. As discussed above with respect to the filter center of mass determination, the combined tap energies may be calculated by adding tap values for subsets of taps that are located on separate sides of nominal center or midpoint of an associated filter. The combined tap energies may be used to determine if the associated filter is drifting off-center. At block 2250, it is determined whether a difference in the combined energies exceeds a threshold. If the difference exceeds the threshold, this indicates that the combined tap energies on one side of the filter midpoint are sufficiently greater than the combined tap energies on the other side of the filter midpoint to indicate that the filter has drifted off-center.

If it is determined at block 2250 that the difference in combined tap energies exceed the threshold, filter tap values are updated according to block 2255. Filter tap values are updated, according to some embodiments, by shifting filter taps of one, or both of the subsets of filter taps, toward or away from the axis point. Such an operation acts to shift the center of mass of the filter towards the center of the filter and thereby allow the filter to avoid drifting towards the filter edge. Following the update of the filter tap values at block 2255, or a determination that the difference in combined tap energies does not exceed the threshold, operations are continued according to block 2245. In such a manner, signals may be acquired, invalid convergence corrected, timing offset compensated, and filter center of mass maintained with efficient processing.

As will be readily understood, the components and modules described with reference to various embodiments above may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of embodiments of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of embodiments of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. An apparatus for adaptive equalization of polarization mode dispersion in an optical signal, comprising:

an input configured to receive multiple input channels corresponding to digitized versions of in-phase and quadrature channels of horizontal and vertical polarity optical signals;

an error calculation module configured to determine combined tap energies for a first subset and a second subset of filter taps of a filter for one of the input channels, the first subset comprising filter taps on a first side from an axis point and the second subset comprising filter taps on a second side from the axis point, wherein a relationship between the combined tap energies for the first and second subsets of filter taps defines a center of mass for the filter; and a center of mass adjustment module configured to shift the center of mass for the filter when combined tap energies of the first subset of filter taps exceed combined tap energies of the second subset of filter taps by a predetermined threshold.

2. The apparatus of claim 1, wherein the error calculation module is further configured to weight the combined tap energies for each of a first and second subset of filter taps by a scaling factor associated with a polarity of the optical signal associated with the filter taps.

3. The apparatus of claim 1, wherein the center of mass adjustment module is configured to shift the center of mass for the filter by shifting each filter tap of the subsets of filter taps toward or away from the axis point.

4. The apparatus of claim 3, wherein the center of mass adjustment module is further configured to provide information related to one or more symbols added or removed from the filtered input channel when the filter taps are shifted toward or away from the axis point.

5. The apparatus of claim 1, further comprising:
a filter module comprising a plurality of filters and a set of filter taps including the first subset of filter taps and the second subset of filter taps, the plurality of filters configured to receive the input channels, filter one or more of the input channels based on the filter tap values, and output filtered input channels.

6. The apparatus of claim 1, wherein the axis point corresponds to a center tap, the first subset of filter taps comprise positive filter taps relative to the center tap, and the second subset of filter taps comprise negative filter taps relative to the center tap.

7. The apparatus of claim 6, wherein the error calculation module is further configured to determine the combined tap energies of the first and second subsets of filter taps based on a magnitude of tap values associated with each tap in each of the first and second subsets of filter taps.

8. The apparatus of claim 6, wherein the error calculation module is further configured to determine combined tap energies for each of the first and second subsets of filter taps by squaring a tap value associated with each tap in each of the first and second subsets of filter taps and summing the squared tap values for each of the first and second subsets of filter taps.

9. A method for adaptive equalization of polarization mode dispersion in an optical signal, the method comprising:
receiving multiple input channels corresponding to digitized versions of in-phase and quadrature channels of horizontal and vertical polarity optical signals;
calculating combined tap energies of a first and a second subset of filter taps associated with a filter for one or more of the input channels, the first subset comprising filter taps on a first side from an axis point of the filter and the second subset comprising filter taps on a second side from the axis point;

determining a center of mass for the filter based on the combined tap energies of the first subset of filter taps and the combined tap energies of the second subset of filter taps; and shifting the center of mass for the filter when combined tap energies of the first subset of filter taps exceeds combined tap energies of the second subset of filter taps by a predetermined threshold.

10. The method of claim 9, further comprising:
filtering one or more of the input channels at the filter.

11. The method of claim 9, wherein the axis point corresponds to a center tap the first subset of filter taps comprise positive filter taps relative to the center tap, and the second subset of taps comprise negative filter taps relative to the center tap.

12. The method of claim 11, wherein calculating the combined tap energies of each of the first and second subsets of filter taps comprises determining a cumulative value of the tap energies based on a magnitude of tap values associated with each tap in each of the first and second subsets of filter taps.

13. The method of claim 11, calculating the combined tap energies of each of the first and second subsets of filter taps comprises:
squaring the tap value associated with each tap in of the first and second subsets of filter taps; and
summing the squared tap values for each of the first and second subsets of filter taps.

14. The method of claim 9, wherein calculating the combined tap energies of the first and second subsets of filter taps further comprises:
weighting each partial combined tap energy by a scaling factor associated with the respective input channel and polarity of the optical signal associated with the taps.

15. The method of claim 9, wherein shifting the center of mass for the filter comprises shifting each filter tap of the subsets of filter taps toward or away from the axis point.

16. The method of claim 15, further comprising:
providing information related to one or more symbols added or removed from the filtered input channel when the filter taps are shifted toward or away from the axis point.

17. An apparatus for adaptive equalization of polarization mode dispersion in an optical signal, comprising:
an input configured to receive multiple input channels corresponding to digitized versions of in-phase and quadrature channels of horizontal and vertical polarity optical signals;
a timing offset detection module coupled with the input module and configured to determine a timing offset between the horizontal and vertical polarity optical signals; and
a tap update module coupled with the timing offset module and configured to determine modified filter tap values when the timing offset exceeds a predetermined threshold, and output filter tap update values to a filter, wherein the filter tap update values shift filter taps of the filter toward or away from an axis point of the filter.

18. The apparatus of claim 17, wherein the predetermined threshold is a non-zero timing offset.

19. The apparatus of claim 18, wherein the tap update module is further configured to provide information related to one or more symbols added or removed from a filtered input channel when the filter taps are shifted toward or away from the axis point.

20. The apparatus of claim 17, wherein each of the input channels is encoded with a unique word and the timing offset detection module is configured to determine the timing offset based on a difference in reception time of the unique words.

21. The apparatus of claim 17, further comprising:
a filter module comprising a plurality of filters and filter taps, each filter configured to receive an input channel, adjust the filter taps based on the received tap update values, and output a filtered input channel, wherein the adjusted filter taps corresponding to one or more of the vertical or horizontal polarity signals have an asymmetric distribution relative to a corresponding center tap when the timing offset exceeds the predetermined threshold.

22. The apparatus of claim 21, wherein the asymmetric distribution becomes symmetric when the timing offset is substantially zero.

23. The apparatus of claim 21, wherein the plurality of filters are each configured to partially filter one or more of the input channels, and output one or more partially filtered input channels.

24. The apparatus of claim 17, wherein the timing offset detection module determines the timing offset upon initial acquisition of the one or more of the multiple input channels.

25. A method for adaptive equalization of polarization mode dispersion in an optical signal, the method comprising:
receiving multiple input channels corresponding to digitized versions of in-phase and quadrature channels of horizontal and vertical polarity optical signals;
determining a timing offset between the horizontal and vertical polarity optical signals; and
determining filter tap update values when the timing offset exceeds a predetermined threshold; and
outputting the filter tap update values to a filter, wherein the filter tap update values shift filter taps of the filter toward or away from an axis point of the filter.

26. The method of claim 25, further comprising:
adjusting one or more of a plurality of filter taps at the filter based on the filter tap update values; and
filtering one or more of the input channels at the filter.

27. The method of claim 26, wherein the predetermined threshold is a non-zero timing offset.

28. The method of claim 25, wherein the determining a timing offset is performed upon initial acquisition of one or more of the multiple input channels.

29. The method of claim 25, wherein the determining filter tap update values comprises determining tap update values that provide adjusted filter tap values corresponding to one or more of the vertical or horizontal polarity signals having an asymmetric distribution relative to a corresponding axis point when the timing offset exceeds the predetermined threshold.

30. The method of claim 29, wherein the asymmetric distribution becomes symmetric when the timing offset is substantially zero.

31. The method of claim 25, wherein each of the input channels is encoded with a unique word and the determining a timing offset comprises determining a time difference in reception time of the unique words.

32. The method of claim 25, further comprising:
providing information related to one or more symbols added or removed from a filtered input channel when the filter taps are shifted toward or away from the axis point.

33. An apparatus for adaptive equalization of polarization mode dispersion in an optical signal, comprising:
an input configured to receive multiple input channels corresponding to digitized versions of in-phase and quadrature channels of horizontal and vertical polarity optical signals;
an invalid convergence detection module coupled with the input module and configured to determine that at least a first input channel corresponding to one of the horizontal or vertical polarity optical signal has invalidly converged to a same polarity signal as at least a second input channel corresponding to the other of the horizontal or vertical polarity optical signals based at least in part on detecting that a first filter associated with the at least the first input channel and a second filter associated with the at least the second input channel are both outputting filtered signals corresponding to a same polarity; and
a tap update module coupled with the invalid convergence detection module and configured to re-initialize filter taps for the first filter when the invalid convergence detection module determines that the first and second filters are outputting filtered signals corresponding to the same polarity.

34. The apparatus of claim 33, wherein the tap update module is configured to re-initialize the filter taps for the first filter based on tap values of the second filter.

35. The apparatus of claim 34, wherein the filter taps for the first filter are re-initialized to correlate to filter taps of the second filter when the invalid convergence detection module determines that the first and second filters are outputting filtered signals corresponding to the same polarity.

36. The apparatus of claim 33, wherein the tap update module is configured to re-initialize the filter taps for the first filter to an initial state when the invalid convergence detection module determines that the first and second filters are outputting filtered signals corresponding to one of the multiple input channels.

37. The apparatus of claim 33, further comprising:
a filter module comprising a plurality of filters and filter taps, each filter configured to receive an input channel, re-initialize the filter taps based on tap values received from the tap update module, and output a filtered input channel.

38. The apparatus of claim 37, wherein the plurality of filters are each configured to partially filter one or more of the input channels based on the filter tap values, and output one or more partially filtered input channels.

39. The apparatus of claim 33, wherein the invalid convergence detection module determines the first and second filters are both outputting filtered signals corresponding to the same polarity upon initial acquisition of the one or more of the multiple input channels.

40. The apparatus of claim 33, wherein each of the input channels is encoded with a unique word and the invalid convergence detection module is configured to determine the first and second filters are outputting filtered signals corresponding to the same polarity based on the unique words contained in the filtered signals.

41. A method for adaptive equalization of polarization mode dispersion in an optical signal, the method comprising:
receiving multiple input channels corresponding to digitized versions of in-phase and quadrature channels of horizontal and vertical polarity optical signals;
determining that at least a first input channel corresponding to one of the horizontal or vertical polarity optical signals has invalidly converged to a same polarity signal as at least a second input channel corresponding to the other of the horizontal or vertical polarity optical signals based at least in part on detecting that a first filter associated with the first input channel and a second filter associated with the second input channel are both outputting filtered signals corresponding to a same polarity; and re-initializing filter taps for the first filter when it is determined that the first and second filters are outputting filtered signals corresponding to the same input channel.

42. The method of claim 41, wherein re-initializing the filter taps for the first filter comprises:
   determining filter tap values for re-initialization of the first filter based on the tap values of the second filter; and
   re-initializing the filter taps for the first filter based on the filter tap values.

43. The method of claim 42, wherein the filter tap values for re-initialization of the first filter are correlated to filter taps of the second filter when the first and second filters are outputting filtered signals corresponding to the same input channel.

44. The method of claim 42, wherein re-initializing the filter taps for the first filter further comprises at least one of:
   re-initializing a subset of the filter taps for the first filter to filter tap values from corresponding filter taps of the second filter and re-initializing a remainder of the filter taps for the first filter not in the subset to default values; or
   re-initializing the filter taps for the first filter to have a same magnitude and opposite sign as tap values from corresponding filter taps of the second filter.

45. The method of claim 41, wherein re-initializing the filter taps for the first filter comprises:
   re-initializing the filter taps for the first filter to an initial state when the first and second filters are outputting filtered signals corresponding to the same input channel.

46. The method of claim 41, wherein the determining is performed upon initial acquisition of the one or more of the multiple input channels.

47. The method of claim 41, wherein each of the input channels is encoded with a unique word, and wherein the determining comprises:
   detecting a unique word encoded in the signals output from each of the first and second filters; and
   determining that the first and second filters are both outputting filtered signals corresponding to the same input channel when the same unique word is detected in the signals output from each of the first and second filters.

* * * * *